(12) United States Patent
Ishida et al.

(10) Patent No.: US 6,298,156 B1
(45) Date of Patent: *Oct. 2, 2001

(54) IMAGE PROCESSING APPARATUS AND METHOD

(75) Inventors: Yoshihiro Ishida, Kawasaki; Shinichiro Koga, Utsunomiya; Nobuyuki Shigeeda, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/630,748

(22) Filed: Apr. 10, 1996

(30) Foreign Application Priority Data

Apr. 11, 1995 (JP) .................................................... 7-085362
Mar. 6, 1996 (JP) .................................................... 8-049187

(51) Int. Cl.$^7$ ...................................................... G06K 9/48
(52) U.S. Cl. .......................... 382/197; 382/199; 382/258; 382/298
(58) Field of Search ..................................... 382/199, 256, 382/258, 266, 298, 299, 300, 301, 197, 198; 358/451; 348/561, 581; 345/127, 136

(56) References Cited

U.S. PATENT DOCUMENTS

| 4,010,446 | * | 3/1977  | Kawa             | 382/258 |
| 4,817,172 | * | 3/1989  | Cho              | 382/256 |
| 4,922,332 | * | 5/1990  | Taniguchi et al. | 358/451 |
| 5,073,956 | * | 12/1991 | Kawamoto et al.  | 382/256 |
| 5,105,471 | * | 4/1992  | Yoshida et al.   | 382/256 |
| 5,204,752 | * | 4/1993  | Yamakawa         | 382/258 |
| 5,299,029 | * | 3/1994  | Moriya et al.    | 382/298 |
| 5,666,439 | * | 9/1997  | Ishida et al.    | 382/190 |

FOREIGN PATENT DOCUMENTS 5-040831   2/1993   (JP) .

* cited by examiner

Primary Examiner—Jon Chang
(74) Attorney, Agent, or Firm—Fitzpatrick, Cella, Harper & Scinto

(57) ABSTRACT

An edge vector extraction unit (122) extracts edge vectors from an input image, and a variable-magnification processing unit (123) performs smoothing/variable-magnification processing of the edge vectors. A vertex point adjustment unit (100) selects each of vertex points constituting an edge vector loop as a vertex point of interest, discriminates the directions of two vertex vectors, which sandwich the edge point of interest, and adjusts the coordinate position of the vertex point of interest sandwiched between the two edge vectors having a predetermined combination on the basis of the combination of the directions, thereby suppressing a deformation of an output image, which may be caused by the variable-magnification processing.

26 Claims, 32 Drawing Sheets

IMAGE PROCESSING APPARATUS AND METHOD

BACKGROUND OF THE INVENTION

The present invention relates to an image processing apparatus and method and, more particularly, to an image processing apparatus and method for processing an image on the basis of the edge vectors of the image.

In association with an apparatus and method for painting a portion inside a closed figure expressed by edge vector data, which are obtained by expressing the edge shape of a binary image by vectors (coordinate values), the present applicant proposed Japanese Patent Laid-Open Nos. 5-20466, 5-20467, 5-20468, and 5-40831. The technique disclosed in each of these references paints pixels located on an edge boundary line while considering these pixels as those present inside the closed figure.

In association with an apparatus and method for extracting edge vectors obtained on the lattice between pixels serving as a boundary between black and white pixel regions of a binary image, the present applicant proposed Japanese Patent Laid-Open Nos. 4-157578 and 5-108823.

In Japanese Patent Laid-Open No. 5-174140, the present applicant discloses an apparatus which can realize independent vertical and horizontal stepless variable-magnification operations of a binary image by comprising a means for performing variable-magnification processing of an image using extracted edge vectors in addition to the above-mentioned means for extracting edge vectors and the means for painting a portion inside a closed figure.

However, with the method disclosed in Japanese Patent Laid-Open No. 5-174140, upon execution of variable-magnification processing at a low magnification factor of about ×1 to ×2, the generated output image often has a relatively large pixel width in a thin line portion. For this reason, the present applicant proposed an improved edge vector extraction method and an image variable-magnification processing method in Japanese Patent Laid-Open No. 6-12490.

In addition to the vector extraction method which can improve variable-magnification processing at a low magnification factor disclosed in Japanese Patent Laid-Open No. 6-12490 above, the present applicant proposed an edge vector smoothing/variable-magnification processing method based on a vector format in Japanese Patent Laid-Open No. 6-337931.

The conventional problem, i.e., a phenomenon associated with an increase in line width of a black pixel region upon execution of variable-magnification processing at a low magnification factor as the problem of the invention disclosed in Japanese Patent Laid-Open No. 5-174140, the result disclosed in Japanese Patent Laid-Open No. 6-12490 as an improved invention of the former invention, and problems remaining unsolved in Japanese Patent Laid-Open No. 6-12490 will be explained below with reference to FIGS. 2 to 9H.

First, symbols commonly used in FIGS. 2 to 9H will be explained. A relatively large circular mark (e.g., 200) represents a black pixel of a binary image. A relatively small circular mark (e.g., 201 represents the position of the start point of a horizontal vector of edge vectors that express a boundary of black and white pixel region of a binary image, and a triangular mark (e.g., 202) represents the position of the start point of a vertical vector of the edge vectors. Arrows represent the directions of these horizontal and vertical vectors.

FIG. 2 shows an example of an input image (digital binary image) as an object to be subjected to stepless variable-magnification processing according to Japanese Patent Laid-Open No. 5-174140. This input image is a rectangle surrounded by 1-pixel wide straight lines and defined by an outer frame of 5 pixels in the horizontal direction ×6 pixels in the vertical direction, and an inner frame of 3 pixels in the horizontal direction ×4 pixels in the vertical direction. Edge vectors extracted using the vector extraction method disclosed in Japanese Patent Laid-Open No. 5-174140 (i.e., the vector extraction method according to Japanese Patent Laid-Open No. 4-157578) are vector groups forming two loops (closed figures), i.e., the outer frame of 5 pixels in the horizontal direction ×6 pixels in the vertical direction, and the inner frame of 3 pixels in the horizontal direction ×4 pixels in the vertical direction.

FIG. 3 shows an enlarged image obtained after variable-magnification processing (×2.0 in the horizontal direction, ×2.0 in the vertical direction) according to Japanese Patent Laid-Open No. 5-174140 is performed for the above-mentioned input image. First, the x-coordinate values (horizontal direction) and y-coordinate values (vertical direction) of the start coordinates of the edge vectors constituting the above-mentioned input image (the outer frame vector loop of 5 pixels in the horizontal direction ×6 pixels in the vertical direction and the inner frame vector loop of 3 pixels in the horizontal direction ×4 pixels in the vertical direction) are multiplied with magnification factors in the respective directions (in this case, 2.0 in both the vertical and horizontal directions), thereby obtaining an outer frame vector loop of 10 pixels in the horizontal direction ×12 pixels in the vertical direction, and an inner frame vector loop of 6 pixels in the horizontal direction ×8 pixels in the vertical direction.

Subsequently, using a painting method according to one of Japanese Patent Laid-Open Nos. 5-20467, 5-20466, 5-20468, 5-40831, and the like, a portion sandwiched between the outer and inner frames including vector loop edge lines after the variable-magnification processing is painted, thereby obtaining the image shown in FIG. 3 after the variable-magnification processing.

The image shown in FIG. 3 after the variable-magnification processing is a rectangle surrounded by 3-pixel wide straight lines and defined by an outer frame of 11 pixels in the horizontal direction ×13 pixels in the vertical direction, and an inner frame of 5 pixels in the horizontal direction ×7 pixels in the vertical direction. Theoretically, an ideal image obtained by enlarging the above-mentioned input image (FIG. 2) to ×2.0 in the vertical and horizontal directions must become a rectangle surrounded by 2-pixel wide straight lines and defined by an outer frame of 10 pixels in the horizontal direction ×12 pixels in the vertical direction and an inner frame of 6 pixels in the horizontal direction ×8 pixels in the vertical direction, as shown in FIG. 5. However, the enlarged image shown in FIG. 3 is generated to have a larger pixel region than the ideal image.

FIG. 4 shows an enlarged image which is obtained by similarly enlarging the input image to ×4.0 in both the vertical and horizontal directions and painting its inner portion. This enlarged image is also generated to have a larger black pixel region than an ideal image since a 5-pixel wide rectangle is reproduced by an outer frame vector loop of 20 pixels in the horizontal direction ×24 pixels in the vertical direction and an inner frame vector loop of 12 pixels in the horizontal direction ×16 pixels in the vertical direction.

On the other hand, FIG. 5 shows edge vector data obtained by applying an improved vector extraction method according to Japanese Patent Laid-Open No. 6-12490 to an input image identical to the above-mentioned input image (FIG. 2). In this case, an outer frame is extracted as a vector loop of 4.5 pixels in the horizontal direction ×5.5 pixels in the vertical direction, and an inner frame is extracted as a vector loop of 3.5 pixels in the horizontal direction and 4.5 pixels in the vertical direction. When the x-coordinate values (horizontal direction) and y-coordinate values (vertical direction) of the start point coordinates of the edge vectors constituting the inner and outer frame vector loops shown in FIG. 5 are multiplied with 2.0 in both the vertical and horizontal directions as the magnification factors in the respective directions, an outer frame vector loop of 9 pixels in the horizontal direction ×11 pixels in the vertical direction and an inner frame vector loop of 7 pixels in the horizontal direction ×9 pixels in the vertical direction are obtained.

Subsequently, using a painting method according to one of Japanese Patent Laid-Open Nos. 5-20467, 5-20466, 5-20468, 5-40831, and the like, a portion sandwiched between the outer and inner frames including pixels on edge lines expressed by the enlarged vector loops is painted, thereby obtaining an ideal enlarged image shown in FIG. 5. In this manner, an ideal enlarged image with a theoretical pixel width can be obtained for enlargement at a relatively low magnification factors of about ×2.0 by the vector extraction method and image processing method according to Japanese Patent Laid-Open No. 6-12490.

However, at a magnification factor of, e.g., ×4.0 larger than ×2.0, an enlarged image having a pixel width smaller than an theoretical pixel width is reproduced, contrary to the image shown in FIG. 3. When the vector loops shown in FIG. 5 are multiplied with ×4.0 in both the vertical and horizontal directions, the outer frame is enlarged to a vector loop of 18 pixels in the horizontal direction ×22 pixels in the vertical direction, and the inner frame is enlarged to a vector loop of 14 pixels in the horizontal direction ×18 pixels in the vertical direction. Even when this image is painted using the above-mentioned painting method, a rectangle with a 3-pixel wide frame is obtained, and the pixel width of the enlarged image is thinner by one pixel than that of an ideal image with a 4-pixels wide frame.

When the enlargement magnification factor is relatively large (e.g., ×5 to ×10), even when black pixels are reproduced to be thicker/thinner by about one pixel than ideal ones, the relative difference from an ideal enlarged image is small, and the visual disadvantage is negligible. Such a difference may even be considered as an effect of allowing easy recognition of a line image. However, when the enlargement magnification factor is relatively small (e.g., ×1 to ×4), the visual disadvantage such as an unnatural feeling is serious even by an increase/decrease in one pixel, and a fine character or line image may be undesirably painted.

As described above, according to the inventions disclosed in the above-mentioned applications by the present applicant, a reproduced image with an ideal pixel width can be obtained with a predetermined magnification range, but an image may be reproduced to be thicker or thinner by one pixel than an ideal pixel width in other magnification ranges.

The present invention has been made in consideration of the above-mentioned problems and has as its object to suppress deformation of an image processed based on edge vectors.

SUMMARY OF THE INVENTION

In order to achieve the above object, an image processing apparatus according to the present invention comprises the following features. That is, an image processing apparatus for processing an image on the basis of edge vectors, comprises acquisition means for acquiring an vertex vector loop which traces edge points constituting an edge of an image in a loop pattern, discrimination means for selecting each of vertex points included in the acquired edge vector loop as a vertex point of interest, and discriminating directions of two vertex vectors which sandwich the edge point of interest therebetween, and vertex point coordinate adjustment means for adjusting a coordinate position of the vertex point of interest on the basis of a discrimination result of the discrimination means.

The image processing apparatus according to the present invention preferably comprises the following features. That is, in the image processing apparatus according to the present invention, the vertex point coordinate adjustment means preferably adjusts the coordinate value of the vertex point of interest on the basis of a combination of the directions of the two vertex vectors, which sandwich the edge point of interest therebetween.

In the image processing apparatus according to the present invention, the vertex point coordinate adjustment means preferably comprises x-coordinate adjustment means for displacing, along an x-axis, the vertex point of interest in a direction to reduce an area of a figure surrounded by the edge vector loop, and y-coordinate adjustment means for displacing, along a y-axis, the vertex point of interest in a direction to reduce the area of the figure surrounded by the edge vector loop.

In the image processing apparatus according to the present invention, the x-coordinate adjustment means preferably determines whether or not the vertex point of interest is displaced, on the basis of whether or not the combination is a combination in which the vertex point of interest is in shade when the figure surrounded by the edge vector loop is projected onto the y-axis, and the y-coordinate adjustment means preferably determines whether or not the vertex point of interest is displaced, on the basis of whether or not the combination is a combination in which the vertex point of interest is in shade when the figure surrounded by the edge vector loop is projected onto the x-axis.

In the image processing apparatus according to the present invention, a displacement amount by each of the x- and y-coordinate adjustment means is preferably one pixel.

The image processing apparatus according to the present invention preferably further comprises painting means for painting a portion inside the edge vector loop defined by the vertex points whose coordinate positions are adjusted by the vertex point coordinate adjustment means.

The image processing apparatus according to the present invention preferably further comprises output means for outputting an image generated by the painting means.

Another image processing apparatus according to the present invention is an image processing apparatus for processing an image on the basis of edge vectors, comprising acquisition means for acquiring an edge vector loop which traces vertex points constituting an edge of an original image in a loop pattern, magnification factor setting means for setting a magnification factor, variable-magnification means for performing variable-magnification processing of the edge vector loop at the set magnification factor, and edge adjustment means for adjusting an edge defined by the edge vector loop so as to reproduce an image which is faithful to the original image and the set magnification factor.

The other image processing apparatus according to the present invention preferably further comprises the following features. That is, in the other image processing apparatus according to the present invention, the edge adjustment means preferably comprises discrimination means for selecting each of vertex points included in the vertex vector loop as an edge point of interest, and discriminating directions of two vertex vectors which sandwich the edge point of interest therebetween, and vertex point coordinate adjustment means for adjusting a coordinate position of the vertex point of interest on the basis of a discrimination result of the discrimination means.

An image processing method according to the present invention is an image processing method for processing an image on the basis of edge vectors, comprising the acquisition step of acquiring an edge vector loop which traces vertex points constituting an edge of an image in a loop pattern, the discrimination step of selecting each of vertex points included in the acquired vertex vector loop as an edge point of interest, and discriminating directions of two edge vectors which sandwich the vertex point of interest therebetween, and the vertex point coordinate adjustment step of adjusting a coordinate position of the vertex point of interest on the basis of a discrimination result in the discrimination step.

Another image processing method according to the present invention is an image processing method for processing an image on the basis of edge vectors, comprising the acquisition step of acquiring an edge vector loop which traces vertex points constituting an edge of an original image in a loop pattern, the magnification factor setting step of setting a magnification factor, the variable-magnification step of performing variable-magnification processing of the edge vector loop at the set magnification factor, and the edge adjustment step of adjusting an edge defined by the edge vector loop so as to reproduce an image which is faithful to the original image and the set magnification factor.

Further objects, features and advantages of the present invention will become apparent from the following detailed description of embodiments of the present invention with reference to the accompanying drawing.

DESCRIPTION OF THE PREFERRED EMBODIMENTS

[First Embodiment]

The first preferred embodiment of the present invention will be described below. In this embodiment, a boundary line between black and white pixel regions of an input image is detected, and the boundary line is extracted as edge vector data expressed by an edge vector loop constituted by a continuum of straight line vectors. Assume that, in this embodiment, the direction of an edge vector is a direction to trace the vector while always observing the black pixel region on its right side.

Such edge vector data can be obtained by, e.g., an edge vector extraction apparatus disclosed in, e.g., Japanese Patent Laid-Open Nos. 4-157578, 5-108823, and the like, which have already been proposed by the present applicant. Outline smoothing/variable-magnification processing of a binary image is realized by applying a binary image outline smoothing/variable-magnification processing apparatus according to Japanese Patent Laid-Open No. 5-174140 or the like to edge vector data extracted by the above-mentioned apparatus. More specifically, of straight line vectors constituting a vector loop, a coupled portion between vertical and horizontal vectors is selected as a portion of interest, and the position of a vertex point, i.e., the portion of interest, between the vertical and horizontal vectors is adjusted on the basis of the connection pattern of the vertical and horizontal vectors, thus obtaining a smoothed variable-magnification image.

If a straight line vector is defined as a vector which has a direction from the start point coordinate to the end point coordinate of the vector, the start point of a given straight line vector is also the end point of its immediately preceding straight line vector on a vector loop to which the vector belongs, and the end point of this vector is also the start point of the next straight line vector on the vector loop to which the vector belongs.

Figure 13:
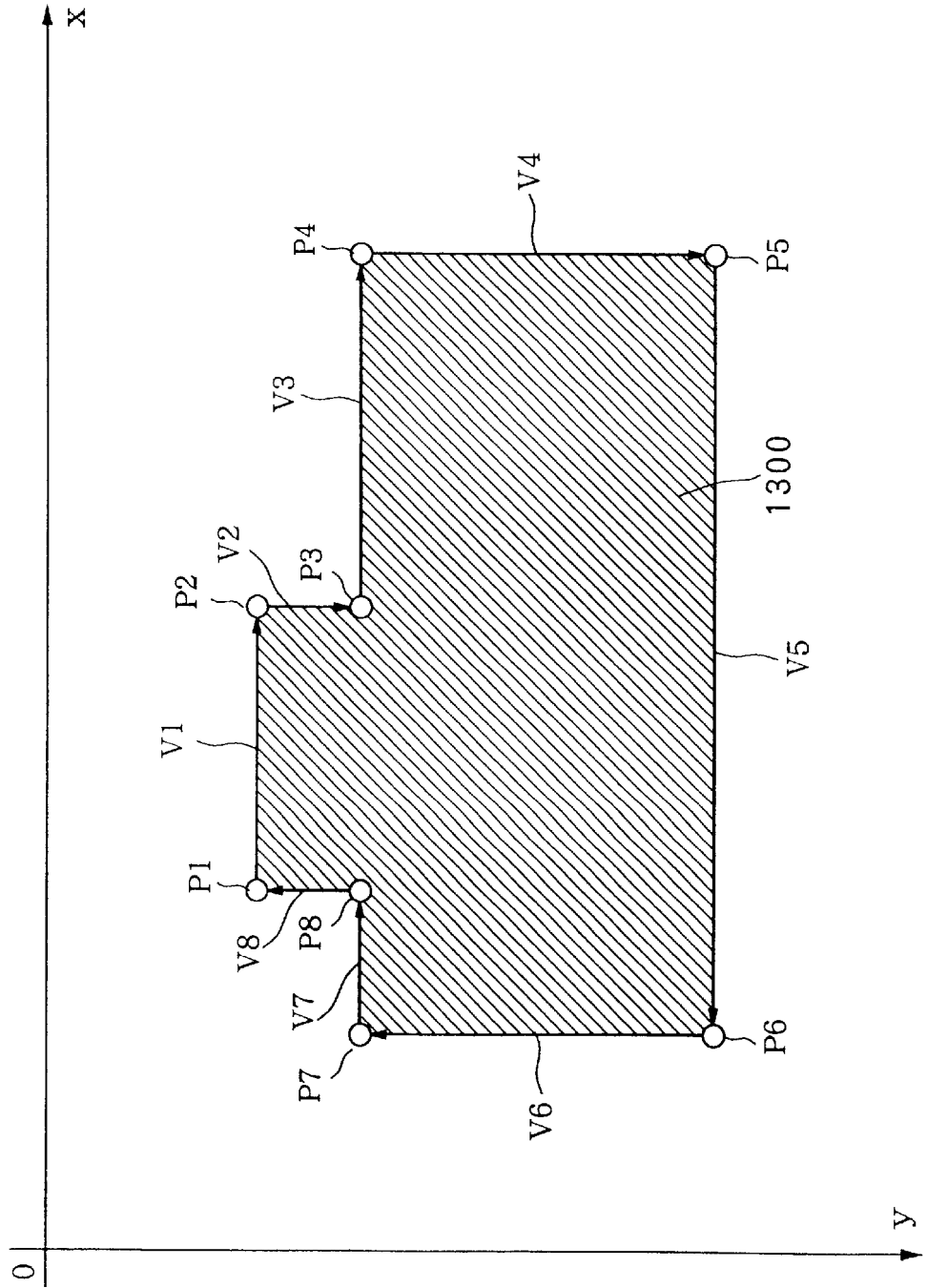
FIG. 13 is a view showing an example of edge vectors.

FIG. 13 shows an example of edge vectors. Reference numeral 1300 denotes a black pixel region; and V1 to V8, edge vectors of the black pixel region 1300. Reference numerals P1 to P8 denotes the start or end points of edge vectors V1 to V8, and these points will be also referred to as vertex points hereinafter. The coordinate position of each vertex point is defined by a two-dimensional orthogonal coordinate system. In this embodiment, the x-coordinate is defined in the rightward direction, and the y-coordinate is defined in the downward direction. In the example shown in FIG. 13, when the straight line vector VI is selected as a vector of interest, the point P1 is the start point of the straight line vector V1, while when the straight line vector V8 is selected as a vector of interest, the point P1 is the end point of the straight line vector V8. Also, when the straight line vector V1 is selected as a vector of interest, the point P2 is the end point of the straight line vector V1, while when the straight line vector V2 is selected as a vector of interest, the point P2 is the start point of the straight line vector V2.

When the start and end point coordinates of a vector are expressed by a two-dimensional orthogonal coordinate system (x, y), a vertical vector is a straight vector whose start and end point coordinates have equal x-coordinate values but different y-coordinate values. On the other hand, a horizontal vector is a straight line vector whose start and end point coordinates have different x-coordinate values but equal y-coordinate values.

The above-mentioned coupled portion between the vertical and horizontal vectors is a vertex point, and corresponds to the points P1 to P8 as the start or end points of the edge vectors V1 to V8 in the example shown in FIG. 13.

In this embodiment, the vertex points which have been subjected to the smoothing/variable-magnification processing based on the coordinate values (edge vectors) of the edge points extracted by the above-mentioned method are adjusted (to be referred to as vertex point adjustment processing hereinafter).

The vertex point adjustment processing according to this embodiment will be described below with reference to the accompanying drawings. FIGS. 8A to 9H show the vertex points before and after execution of the vertex point adjustment processing. FIGS. 8A to 8D and FIGS. 9A to 9D show the vertex points before the vertex point adjustment processing, i.e., after edge vectors are extracted from an input image and are subjected to smoothing/variable-magnification processing. FIGS. 8E to 8H and FIGS. 9E to 9H show the vertex points after the vertex point adjustment processing. A hatched region in each of FIGS. 8A to 9H indicates a black pixel region. Since edge vectors are extracted from an input image on the basis of horizontal and vertical elements as constituting elements, two straight line vectors constituting one vertex point are coupled to form right angles (90° or 270°) therebetween. Therefore, the connection pattern between the two vectors can be classified into a total of eight patterns, i.e., four patterns when two vectors form an apex angle of 90° therebetween, and four patterns when two vectors form an apex angle of 270° therebetween, except for an exceptional case.

In the orthogonal coordinate system that defines the coordinate values of a straight line vector, the x-coordinate is defined in the rightward direction, and the y-coordinate is defined in the downward direction, as in the example shown in FIG. 13. Therefore, when the y-coordinate value of the start point of a vertical vector is larger than that of its end point, the vertical vector constitutes a vector in the upward direction (to be referred to as an upward vector hereinafter); when the y-coordinate value of the start point of a vertical vector is smaller than that of its end point, the vertical vector constitutes a vector in the downward direction (to be referred to as a downward vector hereinafter). On the other hand, when the x-coordinate value of the start point of a horizontal vector is larger than that of its end point, the horizontal vector constitutes a vector in the leftward direction (to be referred to as a leftward vector hereinafter); when the x-coordinate value of the start point of a horizontal vector is smaller than that of its end point, the horizontal vector constitutes a vector in the rightward direction (to be referred to as a rightward vector hereinafter). The exceptional connection pattern is obtained when the coordinate values (x, y) of the start and end points are equal to each other, i.e., when a vector constitutes not a straight line but a point. In this case, this point is ignored or is removed in advance.

The principle of the vertex point adjustment processing in each of the eight different connection patterns will be explained below.

Figure 8A:
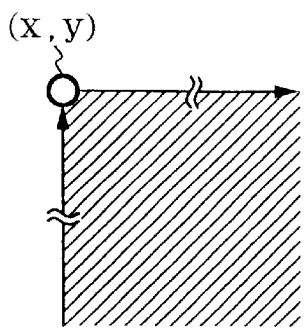
FIGS. 8A to 8H are first views showing an example of connection patterns of vertex points and edge point adjustment processing.
Figure 8E:
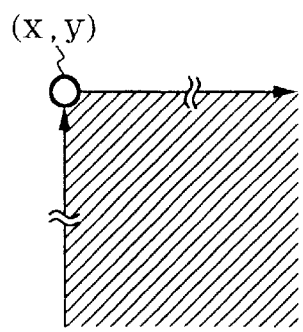

FIG. 8A shows a case wherein an upward vector is connected to a rightward vector while forming an apex angle of 90° therebetween. The vertex point adjustment processing in this case changes neither the x-coordinate value nor the y-coordinate value of an vertex point present between the two vectors, which point serves as both the end point of the upward vector and the start point of the rightward vector. The coordinate values of the processed vertex point are as shown in FIG. 8E.

Figure 8B:
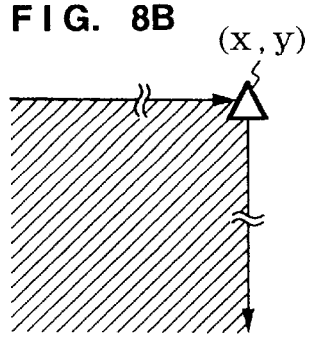
Figure 8F:
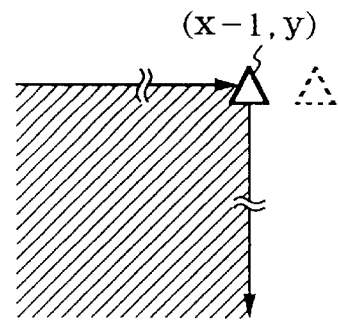

FIG. 8B shows a case wherein a rightward vector is connected to a downward vector while forming an apex angle of 90° therebetween. The vertex point adjustment processing in this case subtracts 1 from the x-coordinate value of an vertex point present between the two vectors, which point serves as both the end point of the rightward vector and the start point of the downward vector, and does not change the y-coordinate value of the vertex point. The coordinate values of the processed vertex point are as shown in FIG. 8F.

Figure 8C:
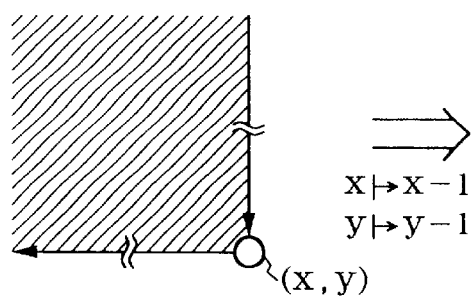
Figure 8G:
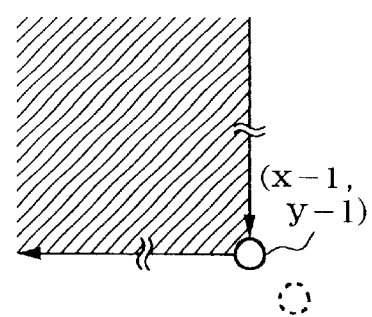

FIG. 8C shows a case wherein a downward vector is connected to a leftward vector while forming an apex angle of 90° therebetween. The vertex point adjustment processing in this case subtracts 1 from both the x- and y-coordinate values of an edge vertex present between the two vectors, which point serves as both the end point of the downward vector and the start point of the leftward vector. The coordinate values of the processed vertex point are as shown in FIG. 8G.

Figure 8D:
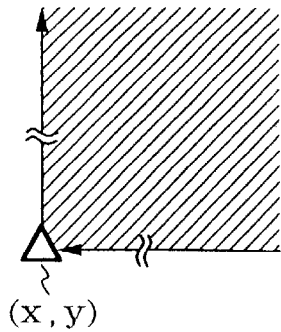
Figure 8H:
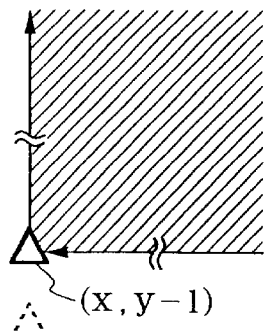

FIG. 8D shows a case wherein a leftward vector is connected to an upward vector while forming an apex angle of 90° therebetween. The vertex point adjustment processing in this case does not change the x-coordinate value of a vertex point present between the two vectors, which point serves as both the end point of the leftward vector and the start point of the upward vector, and subtracts 1 from the y-coordinate value of the vertex point. The coordinate values of the processed vertex point are as shown in FIG. 8H.

Figure 9A:
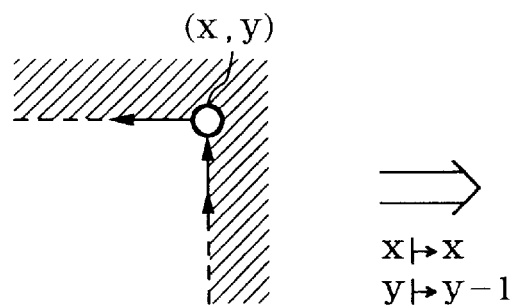
FIGS. 9A to 9H are second views showing an example of connection patterns of vertex points and edge point adjustment processing.
Figure 9E:
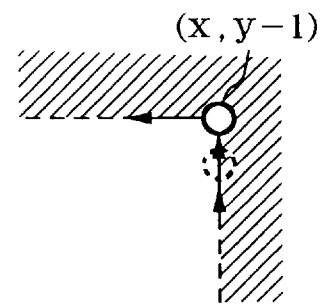

FIG. 9A shows a case wherein an upward vector is connected to a leftward vector while forming an apex angle of 270° therebetween. The vertex point adjustment processing in this case does not change the x-coordinate value of a vertex point present between the two vectors, which point serves as both the end point of the upward vector and the start point of the leftward vector, and subtracts 1 from the y-coordinate value of the vertex point. The coordinate values of the processed vertex point are as shown in FIG. 9E.

Figure 9B:
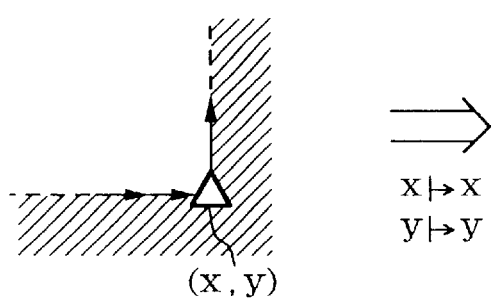
Figure 9F:
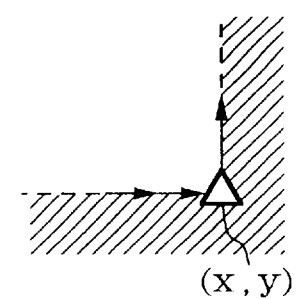

FIG. 9B shows a case wherein a rightward vector is connected to an upward vector while forming an apex angle of 270° therebetween. The vertex point adjustment processing in this case changes neither the x-coordinate value nor the y-coordinate value of a vertex point present between the two vectors, which point serves as both the end point of the rightward vector and the start point of the upward vector. The coordinate values of the processed vertex point are as shown in FIG. 9F.

Figure 9C:
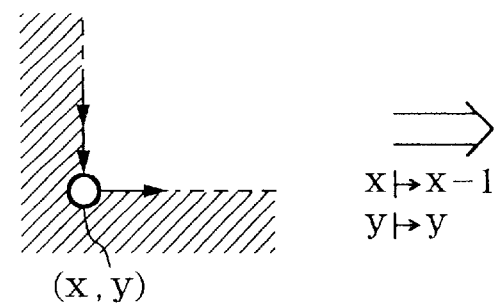
Figure 9G:
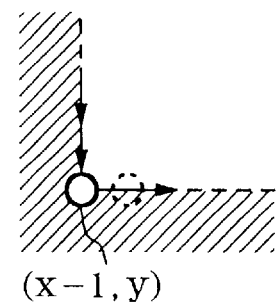

FIG. 9C shows a case wherein a downward vector is connected to a rightward vector while forming an apex angle of 270° therebetween. The vertex point adjustment processing in this case subtracts 1 from the x-coordinate value of a vertex point present between the two vectors, which point serves as both the end point of the downward vector and the start point of the rightward vector, and does not change the y-coordinate value of the vertex point. The coordinate values of the processed vertex point are as shown in FIG. 9G.

Figure 9D:
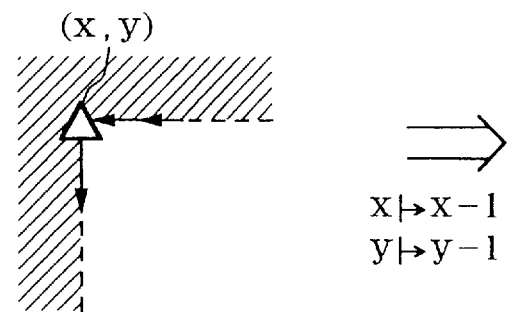
Figure 9H:
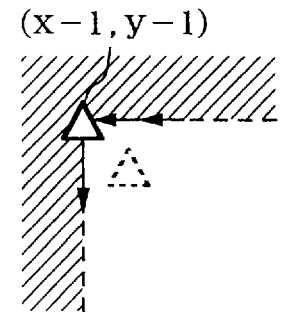

FIG. 9D shows a case wherein a leftward vector is connected to a downward vector while forming an apex angle of 270° therebetween. The vertex point adjustment processing in this case subtracts 1 from both the x- and y-coordinate values of a vertex point present between the two vectors, which point serves as both the end point of the leftward vector and the start point of the downward vector. The coordinate values of the processed vertex point are as shown in FIG. 9H.

Figure 3:
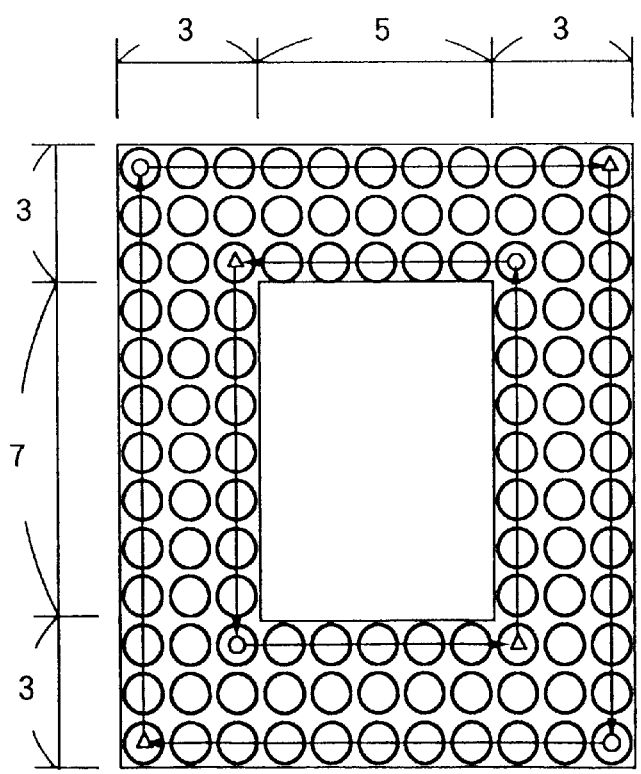
FIG. 3 is a view showing an output image obtained by conventional outline vector variable-magnification processing at a low magnification factor.
Figure 4:
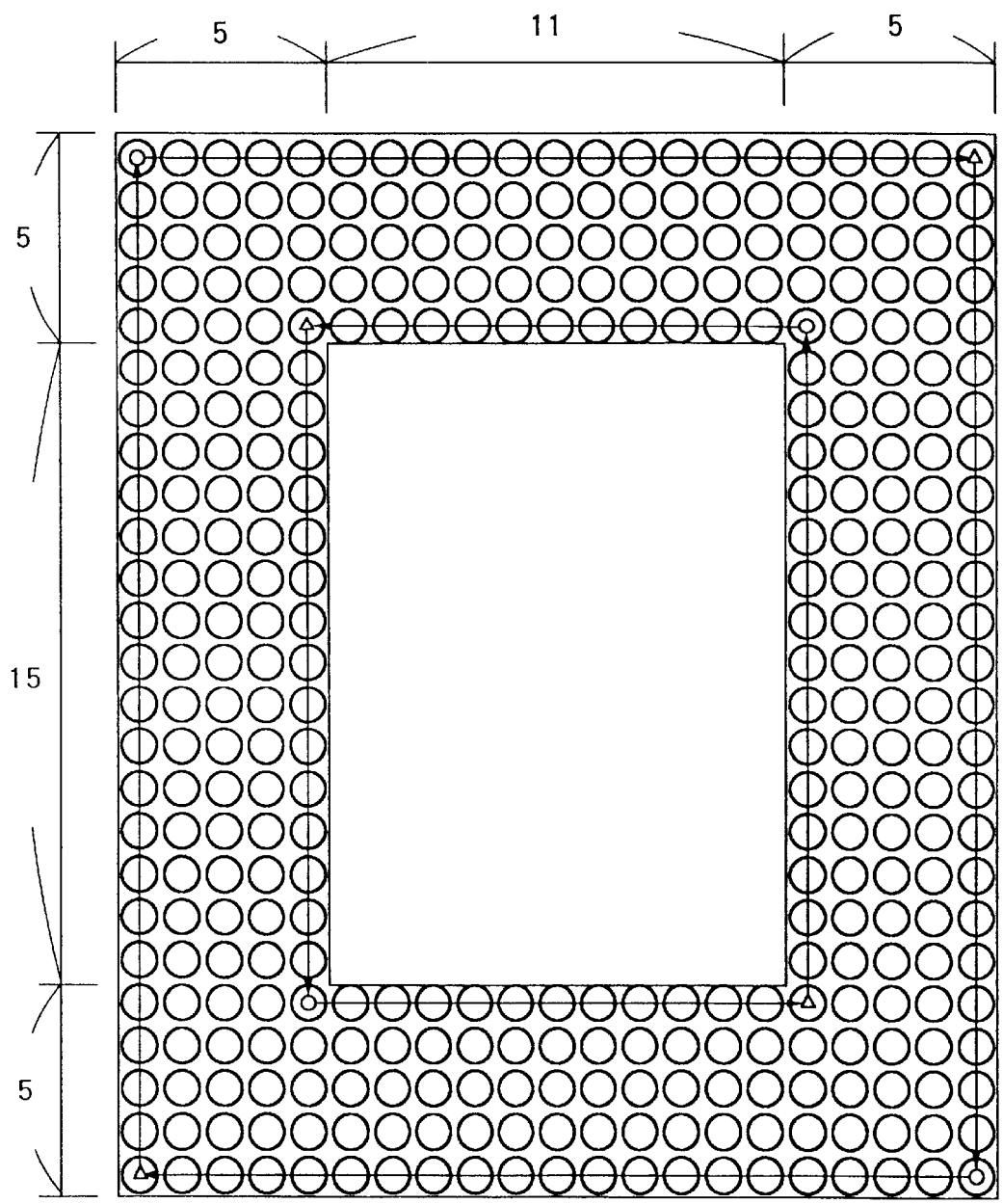
FIG. 4 is a view showing an output image obtained by conventional outline vector variable-magnification processing at a high magnification factor.
Figure 5:
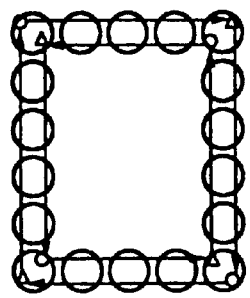
FIG. 5 is a view showing another example of an original image and its edge vector data.
Figure 6:
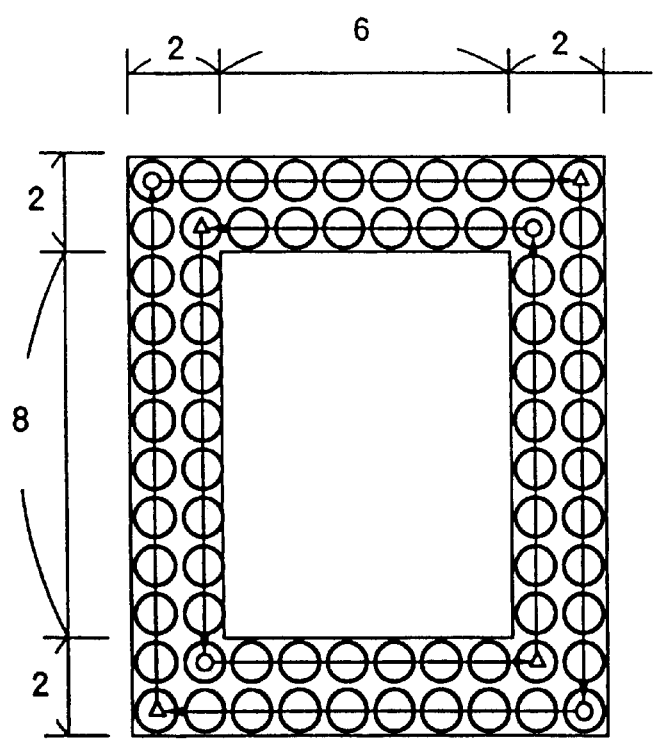
FIG. 6 is a view showing an ideally enlarged output image at a low magnification factor obtained from the original image.
Figure 7:
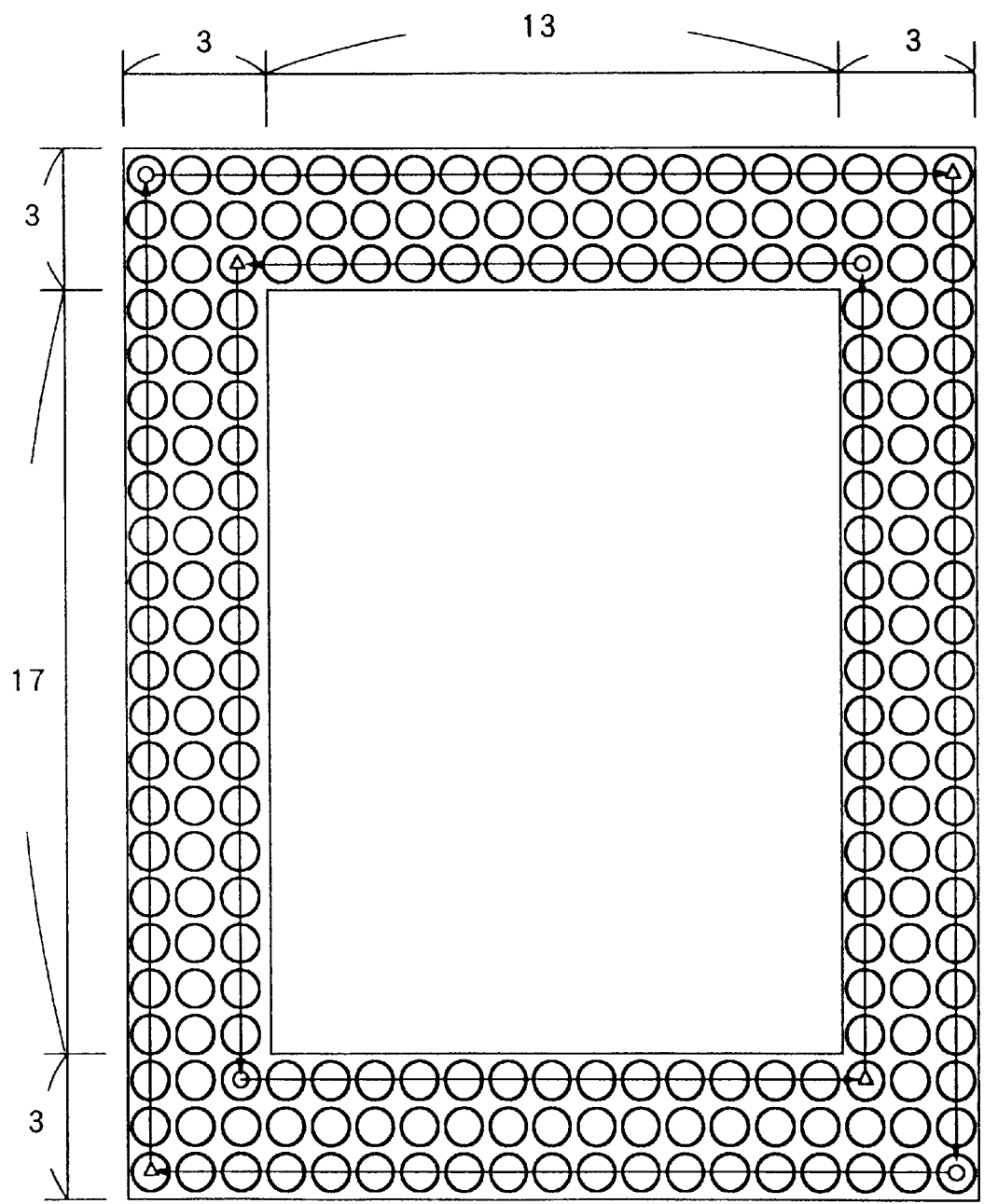
FIG. 7 is a view showing an output image obtained by another conventional outline vector variable-magnification processing at a high magnification factor.
Figure 10A:
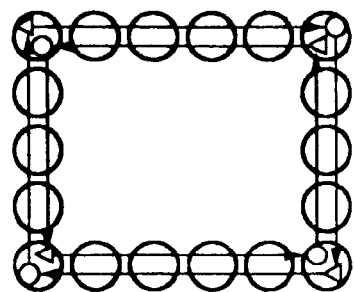
FIGS. 10A and 10B are views showing the reproduction result of an input image at an equal magnification factor.
Figure 10B:
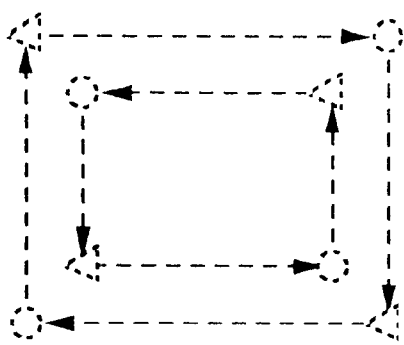
Figure 11B:
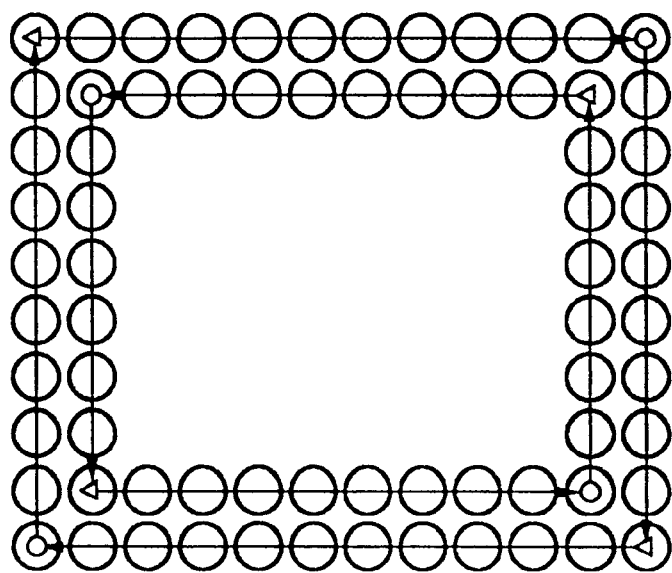
FIGS. 11A and 11B are views showing the reproduction result of an input image at enlargement factors of ×2.0 in both the vertical and horizontal directions.
Figure 11A:
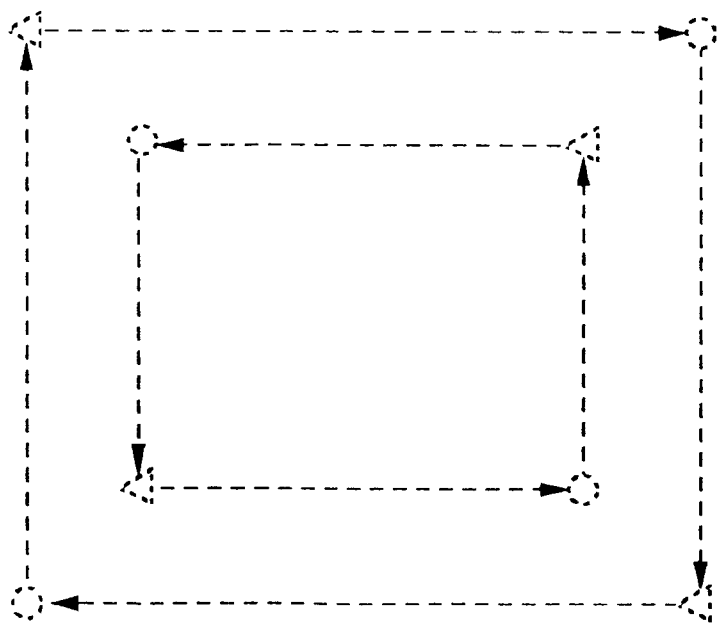
Figure 12A:
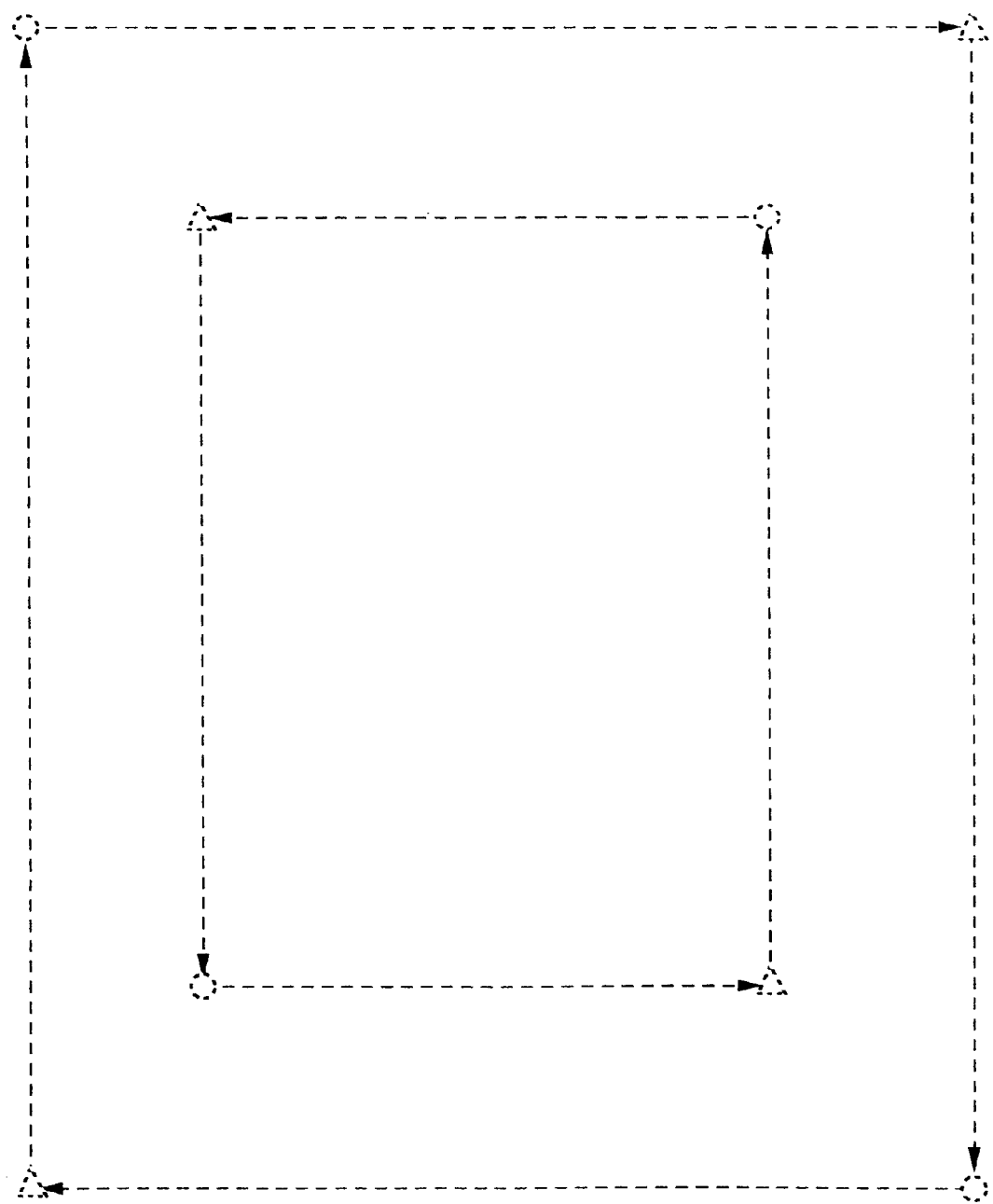
FIGS. 12A and 12B are views showing the reproduction result of an input image at enlargement factors of ×4.0 in both the vertical and horizontal directions.
Figure 12B:
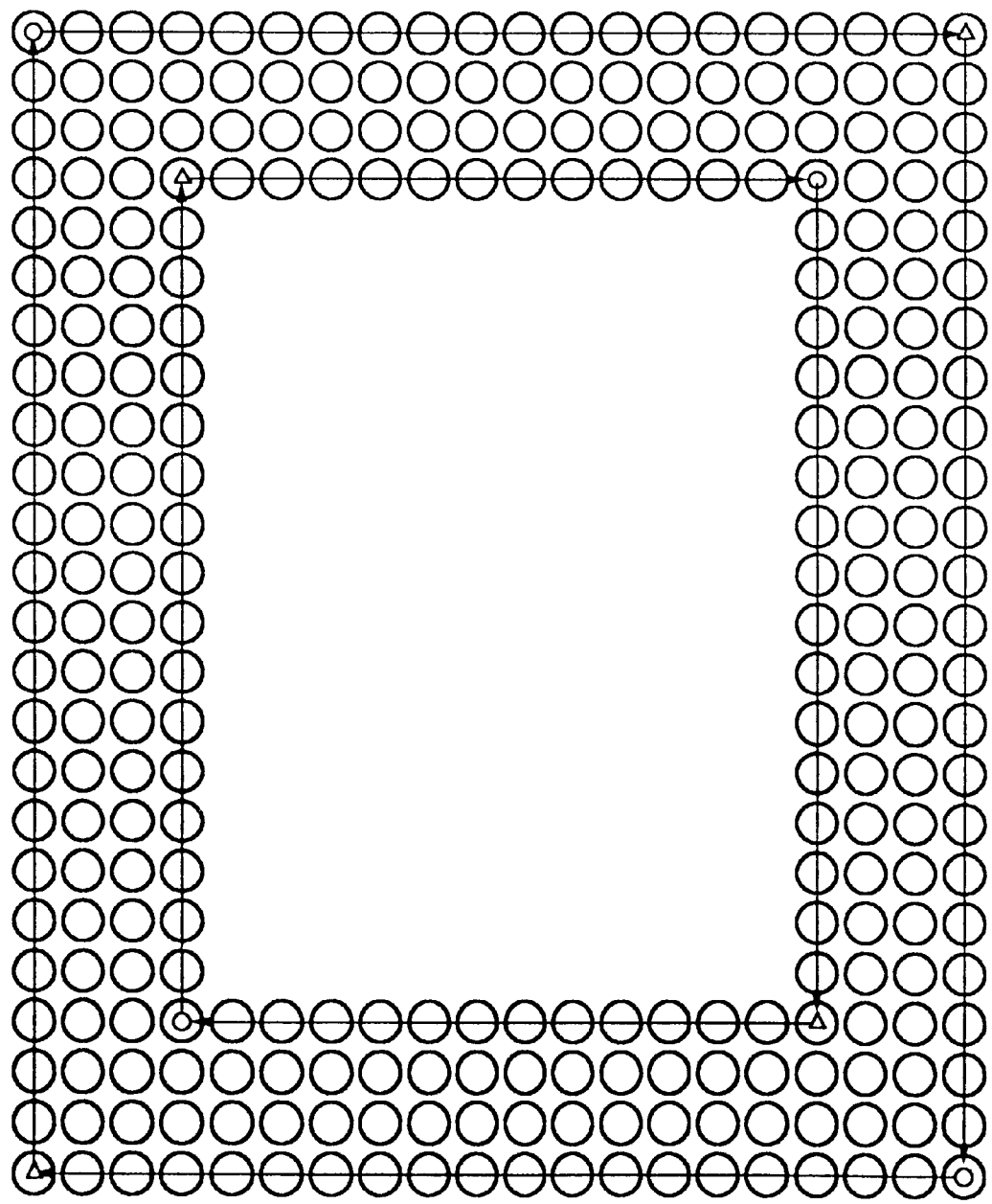

The results of the above-mentioned vertex point adjustment processing will be described below. FIGS. 10A, 11A, and 12A show vector loops identical to those after variable-magnification processing (FIG. 10A shows a vector loop at an equal magnification) shown in FIGS. 2 to 4. FIGS. 10B, 11B, and 12B show the results of vertex point adjustment processing and painting processing for vertex points constituting these vector loops. As described above, the painting processing is one for painting a region present between vector loops (on the right side in the pointing direction of a vector) including pixels on the vector loops (including pixels located on edges defined by the vector loops) (i.e., processing for selectively painting portions inside and outside the loops as different regions, so that the region outside the loops becomes a white pixel region and the region inside the loops becomes a black pixel region).

FIG. 10B shows a case wherein an input image (FIG. 2) is reproduced at an equal magnification (×1.0 in both the vertical and horizontal directions), FIG. 11B shows a case wherein an input image is reproduced at an enlarged scale of ×2.0 in both the vertical and horizontal directions, and FIG. 12B shows a case wherein an input image is reproduced at an enlarged scale of ×4.0 in both the vertical and horizontal directions. As can be understood from FIGS. 10B, 11B, and 12B, reproduced images are obtained by accurately enlarging an input image to ×1.0, ×2.0, and ×4.0, respectively.

Figure 1:
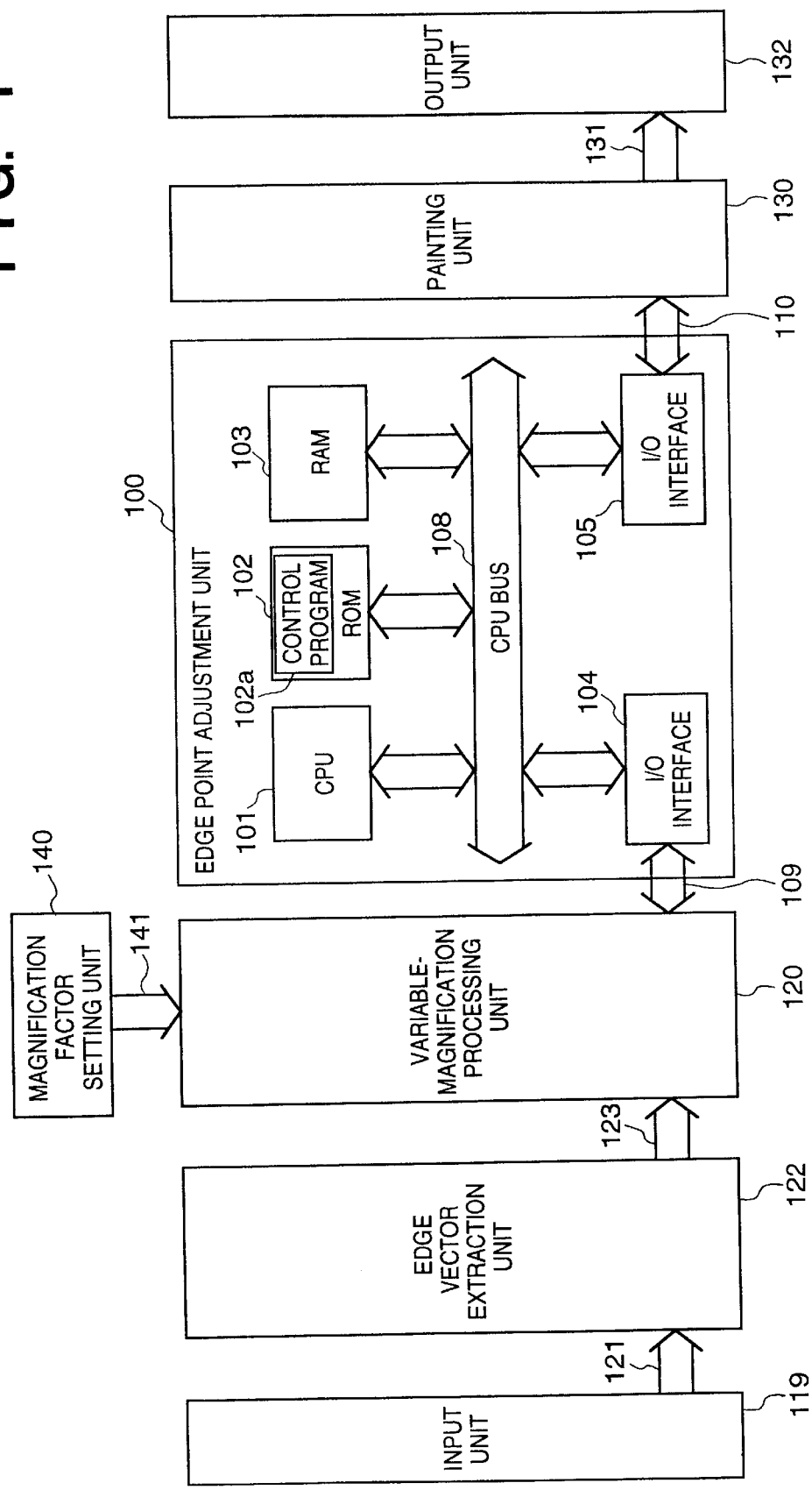
FIG. 1 is a block diagram showing the arrangement of an outline smoothing/variable-magnification processing apparatus according to the first embodiment of the present invention.
Figure 2:
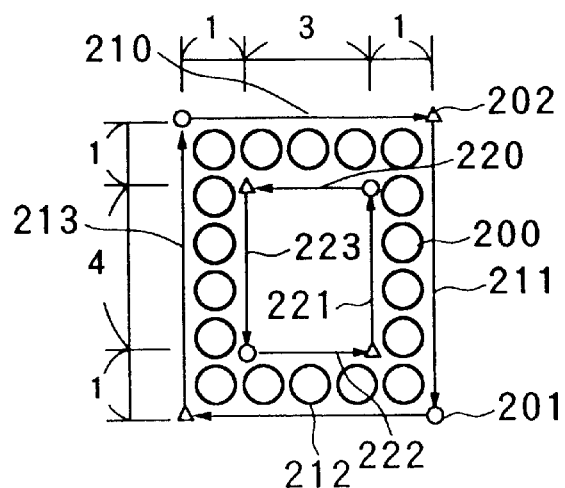
FIG. 2 is a view showing an example of an original image and its edge vector data.

The arrangement of an apparatus for realizing the above-mentioned processing will be described below. FIG. 1 is a block diagram showing the arrangement of an outline smoothing/variable-magnification processing apparatus according to this embodiment. Referring to FIG. 1, an input unit 119 fetches an image via a scanner, a communication device, or the like, and supplies the image to an edge vector extraction unit 122 via a signal line 121. As the format of an input image, an input image in the raster format as shown in FIG. 2 is preferable. The edge vector extraction unit 122 extracts edge vectors from the input image, and supplies the edge vectors to a variable-magnification processing unit 120 via a signal line 123. Extraction of edge vectors from an input image can be realized in such a manner that, for example, a boundary line between black and white pixel regions is detected from an input image, the boundary line is replaced by coupled line segments in the horizontal and vertical directions, and the direction of an edge vector defined by each line segment is determined to be a direction to trace the edge lines in a loop pattern while observing the black pixel region on its right side. Note that the details of the edge vector extraction method are disclosed in Japanese Patent Laid-Open Nos. 4-157578 and 5-108823.

The variable-magnification processing unit 120 comprises an edge vector extraction means according to Japanese Patent Laid-Open No. 4-157578 or 5-108823 already disclosed by the present applicant, and a binary image outline smoothing/variable-magnification means according to Japanese Patent Laid-Open No. 5-174140. The unit 120 performs outline smoothing/variable-magnification processing for input edge vectors at a magnification factor set by a magnification factor setting unit 140, and supplies the processing result to an edge point adjustment unit 100 via a signal line 109. The magnification factor setting unit 140 sets the magnification factor on the basis of an instruction input via, e.g., an operation panel, a communication device, or the like (not shown).

In the smoothing/variable-magnification processing, for example, vertex points constituting the extracted edge vectors are classified into non-corner points to be subjected to smoothing (for example, vertex points of edge vectors that define a staircase line, which is originally an oblique line) and corner points not to be subjected to smoothing (e.g., the vertices of a rectangle). As for a non-corner point of interest, the weighted means of its coordinate values and the coordinate values of vertex points on the right and left sides of the point of interest are calculated, and they replace the coordinate values of the non-corner point of interest. The smoothing/variable-magnification processing in this embodiment includes a first smoothing/variable-magnification process, and a second smoothing process following the first process.

Figure 23:
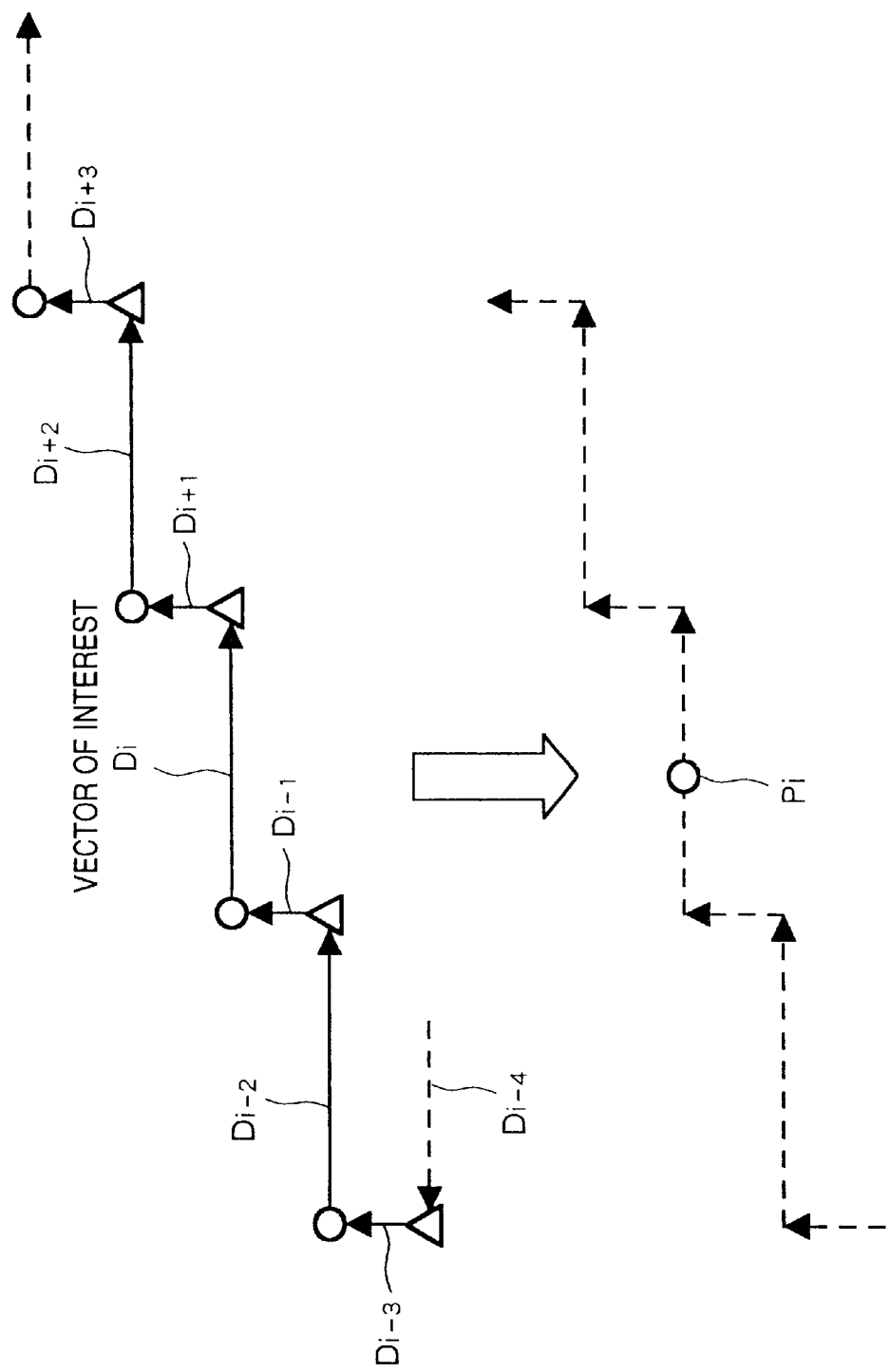
FIG. 23 is a view showing an example of the first smoothing/variable-magnification processing.

The first smoothing/variable-magnification process will be explained below. In this processing, for edge vector groups, which are extracted by the edge vector extraction unit 120 and are arranged in units of loops in the format shown in FIG. 15, a certain edge vector is selected as a vector of interest from each group, and the vector groups are classified depending on the combination pattern of the directions and lengths of several vectors before and after the vector of interest. In accordance with the classification results, whether a vertex point to be re-defined by smoothing is a corner or non-corner point is determined, and the determination result is stored as auxiliary information for the vertex point. If the vertex point is a non-corner point, it is subjected to the smoothing/variable-magnification processing after its position is re-defined to obtain a smooth edge line. On the other hand, if the vertex point is a corner point, it is directly subjected to variable-magnification processing. FIG. 23 shows an example wherein a vector Di is selected as a vector of interest, a vertex point Pi to be re-defined is determined as a non-corner point on the basis of a combination pattern of edge vectors Di−3, Di−2, Di−1, Di+1, Di+2, and Di+3 before and after the vector Di of interest, and the vertex point Pi is subjected to smoothing.

Figure 24:
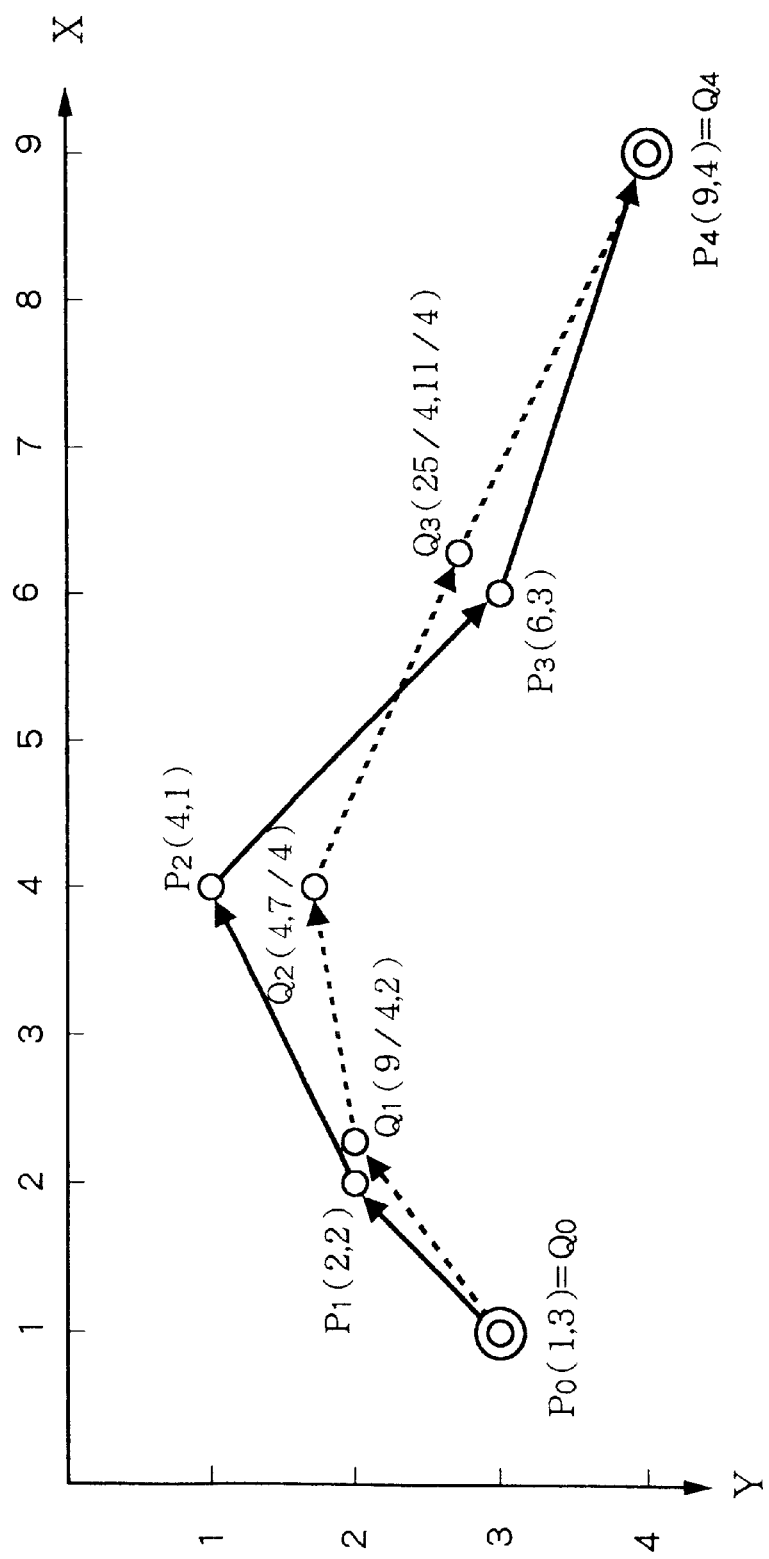
FIG. 24 is a view showing an example of the second smoothing/variable-magnification processing.

The second smoothing process will be explained below. In the second smoothing process, in order to further smooth a vertex line constituted by edge points, which have been subjected to the smoothing/variable-magnification processing in the first smoothing/variable-magnification process, the coordinate values of the non-corner points are calculated again. More specifically, weighted means of the coordinate values of a vertex point of interest, and the coordinate values of vertex points on the right and left sides of the point of interest are calculated, and the calculated values are set as new coordinate values of the point of interest. FIG. 24 shows an example of the second smoothing process. Let Pi(Xi, Yi) be the coordinates of a vertex point of interest, and Pi−1 (Xi−1, Yi−1) and Pi+1 (Xi+1, Yi+1) be the coordinates of vertex points before and after the point of interest. In this case, the coordinates Qi(Xi', Yi') after the second smoothing process corresponding to the vertex point Pi can be calculated by:

$$Xi' = Ki-1 \cdot Xi-1 + Ki \cdot Xi + Ki+1 \cdot Xi+1$$

$$Yi' = Ki-1 \cdot Yi-1 + Ki \cdot Yi + Ki+1 \cdot Yi+1$$

In the example shown in FIG. 24, Ki−1=Ki+1=¼, and Ki=½. Referring to FIG. 24, reference numerals P0 to P4 denote vertex points after the first smoothing/variable-magnification process. Of these points, P0 and P4 are corner points, and are not subjected to the second smoothing process. An edge line defined by P0, Q1 to Q3, and P4 is one defined by vertex points after the second smoothing process.

The vertex point adjustment unit 100 is a block for executing the above-mentioned vertex point adjustment processing. In the vertex point adjustment unit 100, a CPU 101 executes the above-mentioned vertex point adjustment processing while controlling the respective devices connected to a CPU bus 108. A ROM 102 stores a control program 102a to be executed by the CPU 101, predetermined parameters, and the like. A RAM 103 is used as a work memory of the CPU 101. I/O interfaces 104 and 105 are respectively connected to the variable-magnification processing unit 120 and a painting unit 130.

The painting unit 130 paints all pixels in a region surrounded by vector loops defined by edge vectors including pixels located on edge lines expressed by the edge vectors, using the edge vectors which have been subjected to the vertex point adjustment processing and are input via a signal line 110 (i.e., the unit 130 changes these pixels to those having a different color from other regions). For example, an intra-edge painting method according to Japanese Patent Laid-Open Nos. 5-20466, 5-20467, 5-20468, 5-40831, and the like, which have already been proposed by the present applicant, may be applied.

An image painted by the painting unit 130 is output to an output unit 132 such as a printer, a display, or the like via a signal line 131, and is visually output.

For the sake of simplicity, the edge vector extraction unit 122, the variable-magnification processing unit 120, the vertex point adjustment unit 100, and the painting unit 130 have been separately explained. Alternatively, an outline smoothing/variable-magnification processing apparatus may be constituted by supplying a control program for executing edge vector extraction processing, variable-magnification processing, vertex point adjustment processing, and painting processing to a single CPU system.

Figure 14:
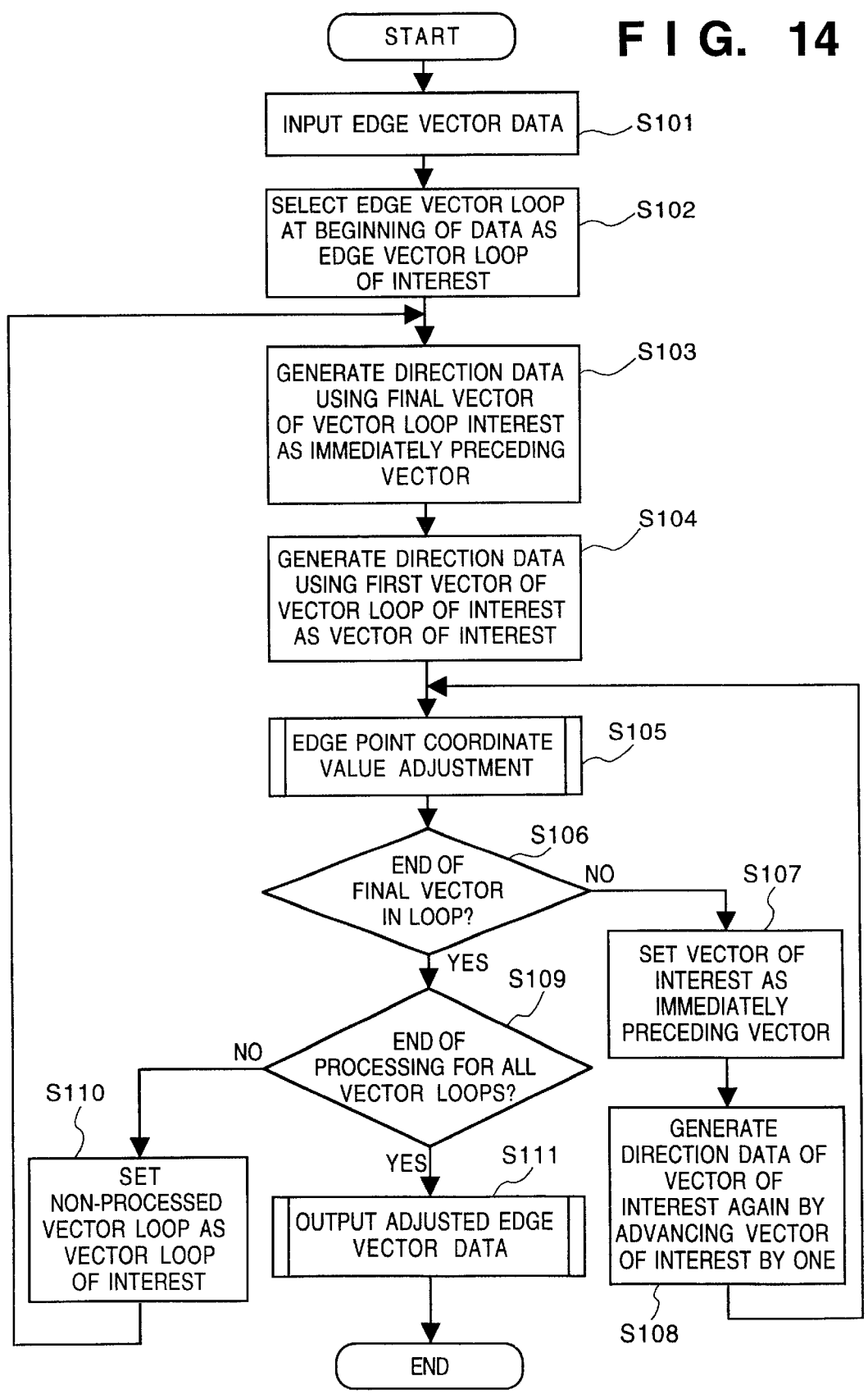
FIG. 14 is a flow chart for explaining the flow of the operation of a vertex point adjustment processing unit 100 according to the first embodiment.

The operation of the vertex point adjustment unit 100 will be described below. FIG. 14 is a flow chart for explaining the flow of the operation of the vertex point adjustment unit 100. Processing associated with this flow chart is executed by the CPU 101 on the basis of the control program 102a. Note that the control program 102a may be supplied from an external device by means of, e.g., a floppy disk.

Figure 15:
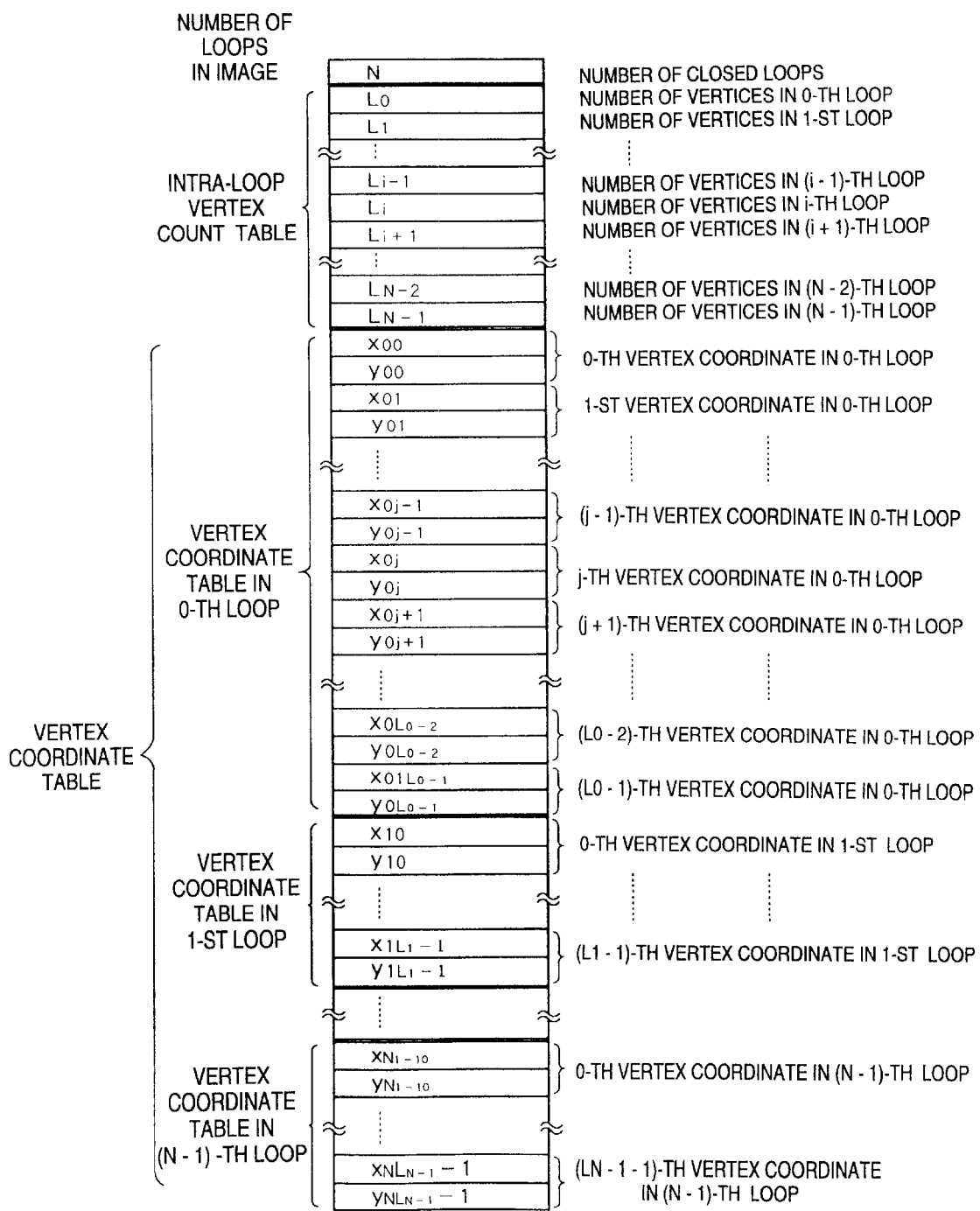
FIG. 15 is a view showing an example of the data format of edge vector data.

In step S101, the CPU 101 receives edge vector data from the variable-magnification processing unit 120 via the signal line 109 and temporarily stores them in the RAM 103. FIG. 15 shows an example of the data format of edge vector data. In this example, the data format has the number of edge vector loops present in a group of edge vector data as the number N of closed loops at the beginning of edge vector data. After the number N of closed loops, the format has the numbers of vertices (or the number of edge vectors) included in N edge vector loops, i.e., 0-th to (N−1)-th loops as data strings L0 to LN−1. The format comprises lists of the coordinates (x, y) of vertices of the respective vector loops in units of loops (the 0-th to (N−1)-th loops).

Note that the edge lines of a boundary between black and white pixel regions in a single binary image can be expressed by N closed loops free from branching and crossing. The edge line constituting each closed loop is considered as a continuum of line segments, and vectors obtained by assigning directions identical to the direction to trace the line segments while observing the black pixel region of an original image on the right side are determined as edge vectors. An edge line which forms a closed loop and is expressed by a continuum of edge vectors will be referred to as an edge vector loop hereinafter. Each of all edge lines which form closed loops and are present in a binary image is expressed as an edge vector loop, and data which expresses each edge vector loop as a set of coordinates of vectors, as shown in FIG. 15, will be referred to as edge vector data hereinafter.

As described above, the start point of each edge vector is also the end point of its immediately preceding edge vector on a vector loop. In other words, the end point of each edge vector is also the start point of the next edge vector on the vector loop. The start and end points of each edge vector will be generally referred to as vertex points or vertices. Since edge vectors are connected in a loop pattern, the number of vertex points (the number of vertices) present on each vector loop is equal to the number of edge vectors on the vector loop.

After the edge vector data are input in step S101, the flow advances to step S102. In step S102, the 0-th loop stored at the beginning of edge vector data in the RAM 103 is selected as a vector loop of interest, and the number of vertices in the vector loop of interest and the storage region of the vertex coordinates are confirmed. Thereafter, the flow advances to step S103.

In step S103, the final vector of the vector loop of interest is selected as an immediately preceding vector (a vector, the end point of which also serves as the start point of the vector of interest), and direction data of the immediately preceding vector are generated. More specifically, assuming that the i-th loop is a vector loop of interest, the coordinate values (xi0, yi0) of the 0-th vertex of the i-th loop and the coordinate values (xiLi−1, yiLi−1) of the (Li−1)-th vertex are read out from the corresponding region on the RAM 103, and direction data Δxp and Δyp of the immediately preceding vector are generated by setting:

Δxp=xi0−xiLi−1

Δyp=yi0−yiLi−1

In the vector coordinate system, as shown in FIG. 12, if the x-axis direction assumes a direction from the left to right as a positive direction, and the y-axis direction assumes a direction from the up to down as a positive direction, the direction of the immediately preceding vector is:

downward when Δxp=0 and Δyp>0 upward when Δxp=0 and Δyp<0 rightward when Δxp>0 and Δyp=0 leftward when Δxp<0 and Δyp=0

As described above, after the direction data of the immediately preceding vector are generated in step S103, the coordinate values (xi0, yi0) are set in the start point coordinate values (xs, ys) of the vector of interest, and the flow then advances to step S104.

In step S104, the coordinate values (xi1, yi1) of the first vertex of the i-th vector loop of interest are read out from the corresponding region on the RAM 103, and are set in the end point coordinate values (xe, ye) of the vector of interest. Then, direction data Δxt and Δyt of the vector of interest are generated as follows using the coordinate values (xi0, yi0) of the 0-th vertex of the i-th loop, which have been already read out and set in the start point coordinate values of the vector of interest in step s103 as well:

Δxt=xe−xs=xi1−xi0

Δyt=ye−ys=yi1−yi0

After the direction data of the vector of interest are generated, the flow advances to step S105.

In step S105, the adjustment processing (to be also referred to as vertex point coordinate value adjustment processing hereinafter) of the coordinate values of the vector of interest is executed on the basis of the direction data Δxp and Δyp of the immediately preceding vector, the direction data Δxt and Δyt of the vector of interest, and the start point coordinate values (xs, ys) of the vector of interest. The vertex point coordinate adjustment processing will be described in detail later.

In step S106, the number of vertex points which have adjusted coordinate values output in step S105 is counted to check if adjustment of all the vertex points in the vector loop of interest is completed. When the number of vertex points having the adjusted coordinate values output in step S105 matches the number of vertices in the vector loop of interest, it is determined that processing is completed for all the vectors in the loop, and the flow advances to step S109; otherwise, the flow advances to step S107.

In step S107, the vector of interest used so far is set as the immediately preceding vector. More specifically, the value Δxt is stored in Δxp, and the value Δyt is stored in Δyp.

In step S108, the vector of interest is advanced by one. That is, the coordinate values of the vertex coordinates next to those used as the start of the vector of interest so far are read out from the edge vector data stored in the RAM 103 in step S101, and are set in the start point coordinate values of a new vector of interest. If the start point coordinates of the vector of interest so far are (xij, yij) of the i-th point in the i-th loop, the start coordinates of the new vector of interest are given by:

xs=xij+1 ys=yij+1

Upon completion of the processing in step S108, the flow returns to step S105 to repeat the vertex point coordinate value adjustment processing for the new vector of interest.

In step S109, the number of loops processed so far in step S109 is counted to check if processing for all the edge vector loops is completed. If the number of times of decision in step S109 becomes equal to the number of closed loops, it is determined that the processing is completed, and the flow advances to step S111; if non-processed loops remain, the flow advances to step S110.

In step S110, the vector loop of interest is updated to the next vector loop. Thereafter, the flow returns to step S103 to repeat the processing for the next vector loop of interest.

In step S111, the edge vector data which have subjected to the vertex point coordinate value adjustment are output to the painting unit 130 via the signal line 110.

Figure 16:
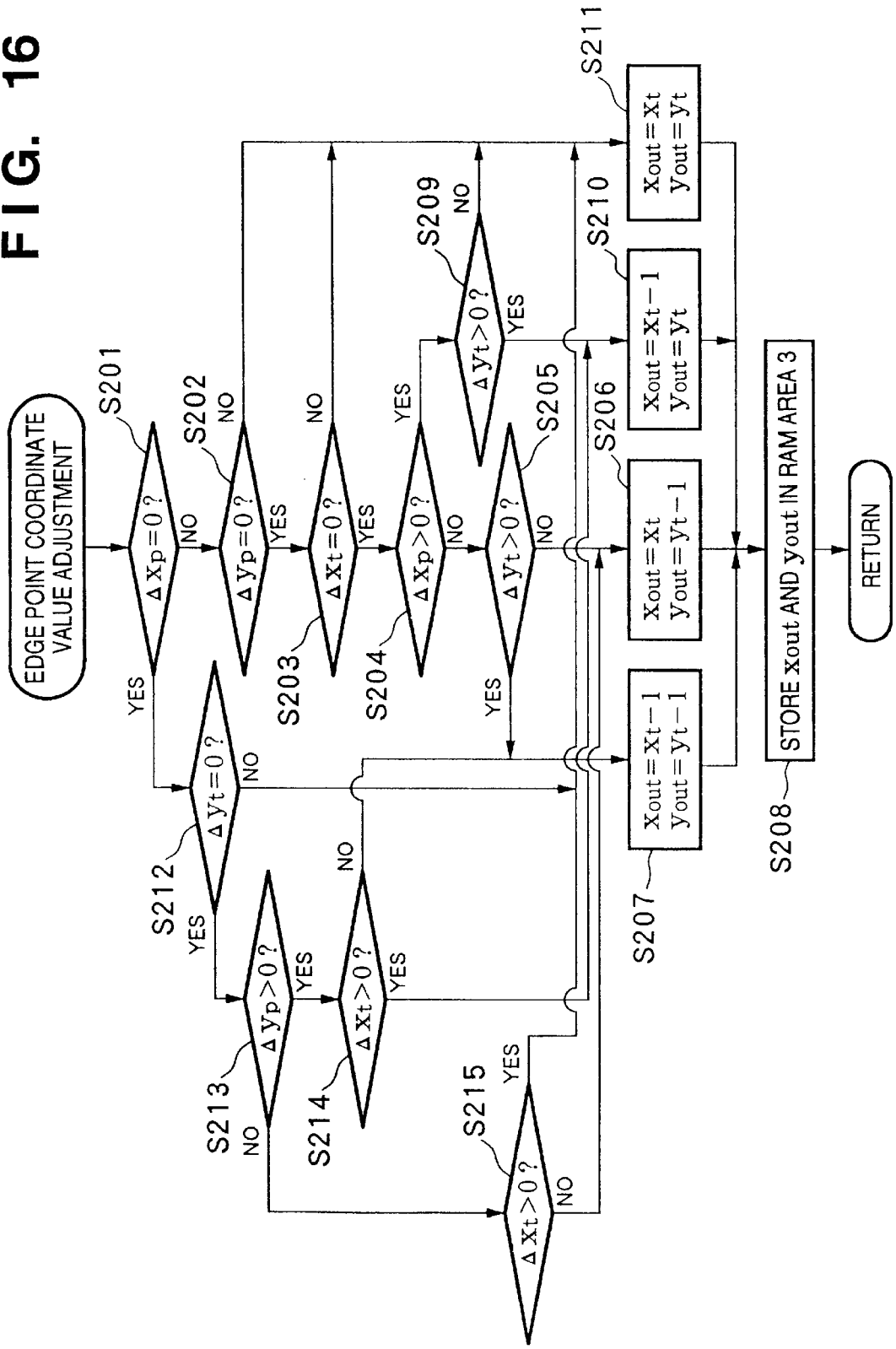
FIG. 16 is a flow chart showing the flow of the processing of a vertex point coordinate value adjustment routine (step S105) according to the first embodiment.

The vertex point coordinate value adjustment routine (step S105) will be explained below. FIG. 16 is a flow chart showing the flow of the processing of the vertex point coordinate value adjustment routine.

When the vertex point coordinate value adjustment routine is called in step S105, the flow advances to step S201. In step S201, it is checked if the value Δxp is 0, i.e., if the immediately preceding vector is a vertical vector (upward or downward). If the immediately preceding vector is a vertical vector (Δxp=0), the flow advances to step S212; otherwise, the flow advances to step S202.

In step S202, it is checked if the value Δyp is 0, i.e., if the immediately preceding vector is a horizontal vector (rightward or leftward). If the immediately preceding vector is a horizontal vector (Δyp=0), the flow advances to step S203; otherwise, it is determined that the immediately preceding vector is neither a vertical vector nor a horizontal vector, and the connection pattern of these vectors corresponds to none of the eight different connection patterns shown in FIGS. 8A to 9H. Therefore, the flow advances to step S211, and the start coordinate values of the vector of interest are directly output without being particularly adjusted.

In step S203, it is checked if the value Δxt is 0, i.e., if the vector of interest is a vertical vector. If the vector of interest is a vertical vector (Δxt=0), the flow advances to step S204; otherwise, it is determined that the vector of interest is not a vertical vector although the immediately preceding vector is a horizontal vector, and the pattern of these vectors corresponds to none of the eight different connection patterns shown in FIGS. 8A to 9H. Therefore, the flow advances to step S211.

In step S204, it is checked if the value Δxp is positive, i.e., the immediately preceding vector is a rightward vector. If the immediately preceding vector is a rightward vector (Δxp>0), the flow advances to step S209; otherwise, since the immediately preceding vector is a leftward vector, the flow advances to step S205.

In step S205, it is checked if the value Δyt is positive, i.e., if the vector of interest is a downward vector. If the vector of interest is a downward vector (Δyt>0), since the immediately preceding vector is a leftward vector and the vector of interest is a downward vector, the connection pattern therebetween corresponds to that shown in FIG. 9D, and the flow advances to step S207. In step S207, processing for outputting vertex point coordinate values adjusted by subtracting 1 from both the x- and y-coordinate values of the start point coordinates of the vector of interest is performed. On the other hand, if the vector of interest is not a downward vector, it is determined that the vector of interest is an upward vector. In this case, since the immediately preceding vector is a leftward vector and the vector of interest is an upward vector, the connection pattern therebetween corresponds to the case shown in FIG. 8D, and the flow advances to step S206. In step S206, processing for outputting vertex point coordinate values adjusted by subtracting 1 from only the y-coordinate value of the start point coordinates of the vector of interest is performed.

Since Δxt=0 has been confirmed in step S203 before the flow advances to step S205, if Δyt =0, the start and end points of the vector of interest have the same x- and y-coordinate values. However, in this embodiment, the following explanation will be given under the assumption that such edge vector whose start and end points have the same coordinate values is not present on an input edge vector loop (such vector may be removed from the vector loop in advance in the pre-processing if necessary, or may be ignored).

In step S206, the x-coordinate value of the start point of the vector of interest is stored in a temporary buffer xout on the RAM 103, and a value obtained by subtracting 1 from the y-coordinate value is stored in a temporary buffer yout on the RAM 103. Thereafter, the flow advances to step S208.

In step S207, 1 is subtracted from the x- and y-coordinate values of the start point of the vector of interest, and the differences are respectively stored in the temporary buffers xout and yout. Thereafter, the flow advances to step S208.

In step S208, the values stored in the temporary buffers xout and yout on the RAM 103 are sequentially stored as adjusted vertex point coordinate values corresponding to the start point of the vector of interest at a corresponding vertex coordinate address of a corresponding loop in an output vertex coordinate table area assured on the RAM 108 to have the same format as that of the vertex coordinate table shown in FIG. 15. Thereafter, the flow returns to the main routine that called this routine.

In step S209, it is checked if Δyt is positive, i.e., the vector of interest is a downward vector, as in step S205. If the vector of interest is a downward vector, since the immediately preceding vector is a rightward vector, the connection pattern therebetween corresponds to that shown in FIG. 8B, and the flow advances to step S210. In step S210, processing for outputting vertex point coordinate values adjusted by subtracting 1 from only the x-coordinate value of the start coordinates of the vector of interest is performed. On the other hand, if the vector of interest is not a downward vector, it is determined that the vector of interest is an upward vector. In this case, since the immediately preceding vector is a rightward vector and the vector of interest is an upward vector, the connection pattern therebetween corresponds to that shown in FIG. 9B. The flow then advances to step S211, and processing for directly outputting the start coordinate values of the vector of interest as adjusted vertex point coordinate values is performed.

In step S210, a value obtained by subtracting 1 from the x-coordinate value of the start point of the vector of interest is stored in the temporary buffer xout, and the y-coordinate of the start point of the vector of interest is stored in the temporary buffer yout. Thereafter, the flow advances to step S208.

In step S211, the x- and y-coordinate values of the start point of the vector of interest are respectively stored in the temporary buffers xout and yout, and the flow advances to step S208.

In step S212, it is checked if the value Δyt is 0, i.e., if the vector of interest is a horizontal vector. If the vector of interest is a horizontal vector (Δyt=0), the flow advances to step S213; otherwise, since it is determined that the vector of interest is not a horizontal vector although the immediately preceding vector is a vertical vector, such a connection pattern corresponds to none of the connection patterns shown in FIGS. 8A to 9H. Therefore, it is determined that the vertex point need not be adjusted, and the flow advances to step S211.

In step S213, it is checked if the value Δyp is positive, i.e., if the immediately preceding vector is a downward vector. If the immediately preceding vector is a downward vector (Δyp=0), the flow advances to step S214; otherwise, since the immediately preceding vector is an upward vector, the flow advances to step S215. In step S214, it is checked if the value Δxt is positive, i.e., if the vector of interest is a rightward vector. If the vector of interest is a rightward vector (Δxt>0), since the immediately preceding vector is a downward vector and the vector of interest is a rightward vector, the connection pattern therebetween corresponds to that shown in FIG. 9C. Therefore, the flow advances to step S210, and processing for outputting vertex point coordinate values adjusted by subtracting 1 from only the x-coordinate value of the start point coordinates of the vector of interest is performed. On the other hand, if the vector of interest is not a rightward vector, it is determined that the vector of interest is a leftward vector. In this case, since the immediately preceding vector is a downward vector and the vector of interest is a leftward vector, the connection pattern therebetween corresponds to that shown in FIG. 8C, and the flow advances to step S207. In step S207, processing for outputting vertex point coordinate values adjusted by subtracting 1 from both x- and y-coordinate values of the start coordinates of the vector of interest is performed.

In step S215, it is checked if the value Δxt is positive, i.e., if the vector of interest is a rightward vector, as in step S214. If the vector of interest is a rightward vector (Δxt>0), since the immediately preceding vector is an upward vector and the vector of interest is a rightward vector, the connection pattern therebetween corresponds to that shown in FIG. 8A, and the flow advances to step S211. In step S211, processing for directly outputting the start point coordinate values of the vector of interest as vertex point coordinate values is performed. If the vector of interest is not a rightward vector, it is determined that the vector of interest is a leftward vector. In this case, since the immediately preceding vector is an upward vector and the vector of interest is a leftward vector, the connection pattern therebetween corresponds to that shown in FIG. 9A, and the flow advances to step 206 to perform processing for outputting vertex point coordinate values adjusted by subtracting 1 from only the y-coordinate value of the start point coordinates of the vector of interest. Upon completion of the vertex point coordinate value adjustment processing in step S105, as described above, the flow advances to step S106.

Figure 17:
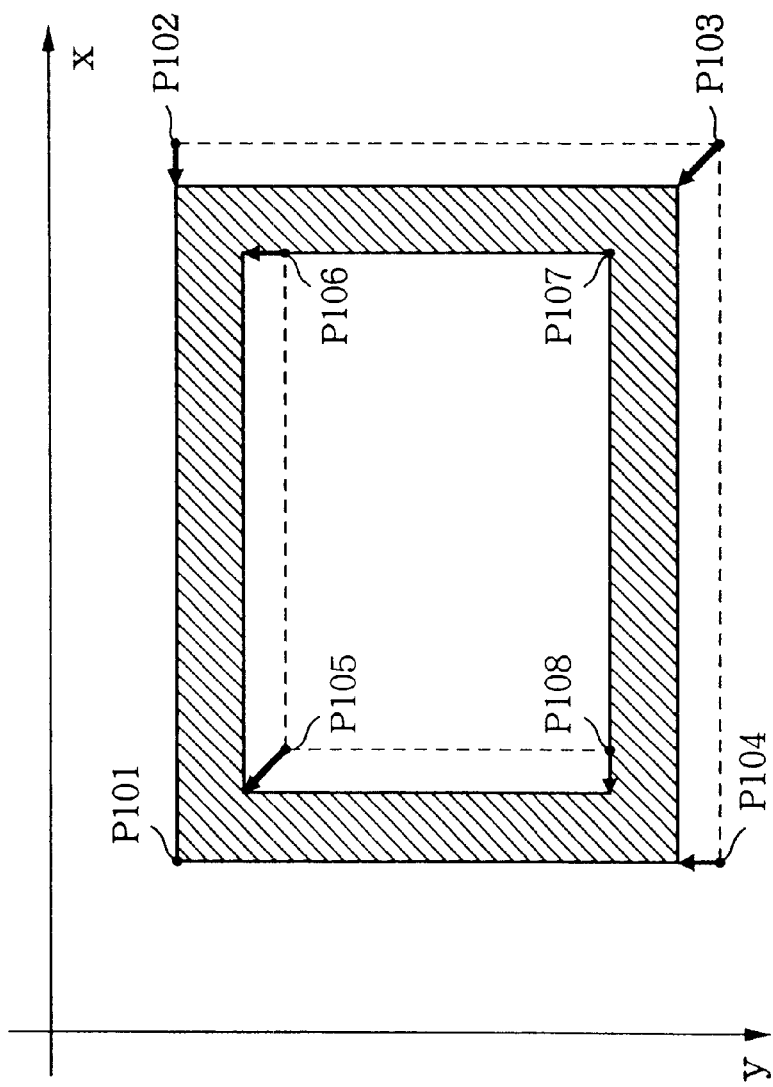
FIG. 17 is a view showing an example of the result of the vertex point adjustment processing.
Figure 18:
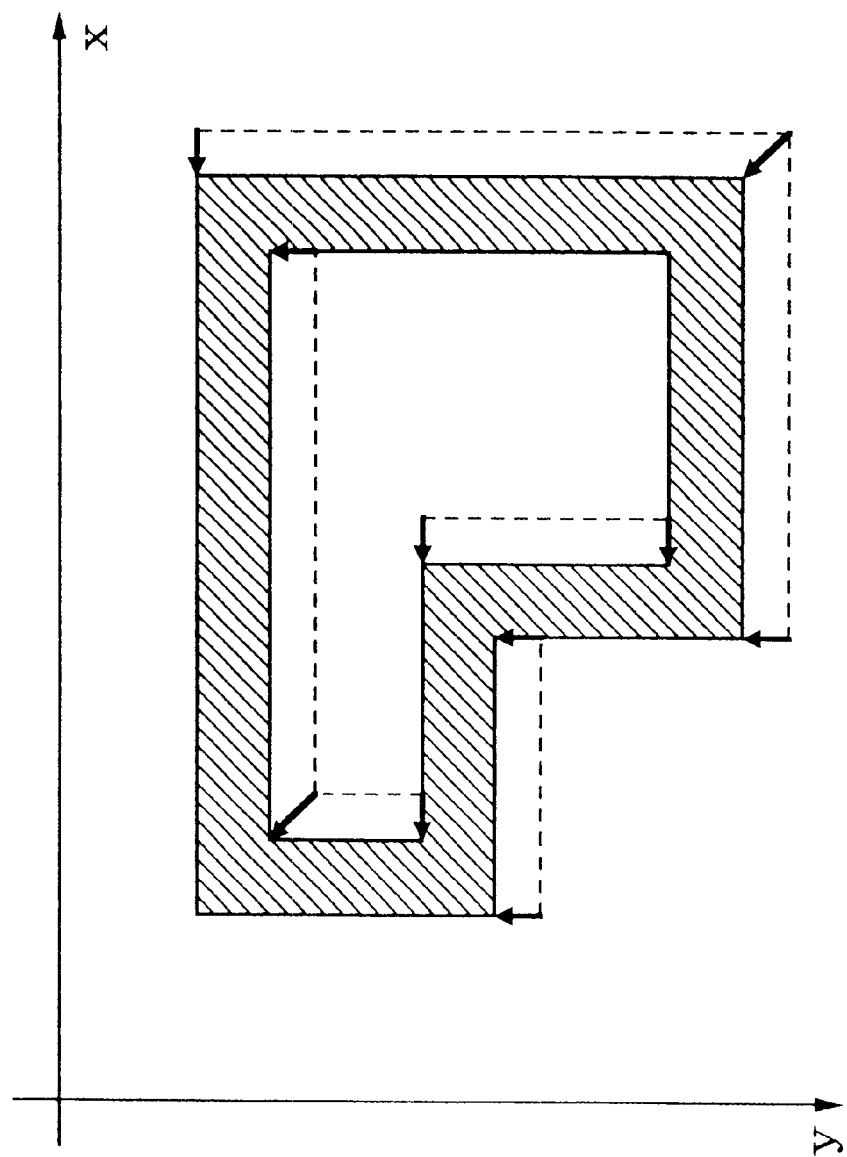
FIG. 18 is a view showing an example of the result of the vertex point adjustment processing.
Figure 19:
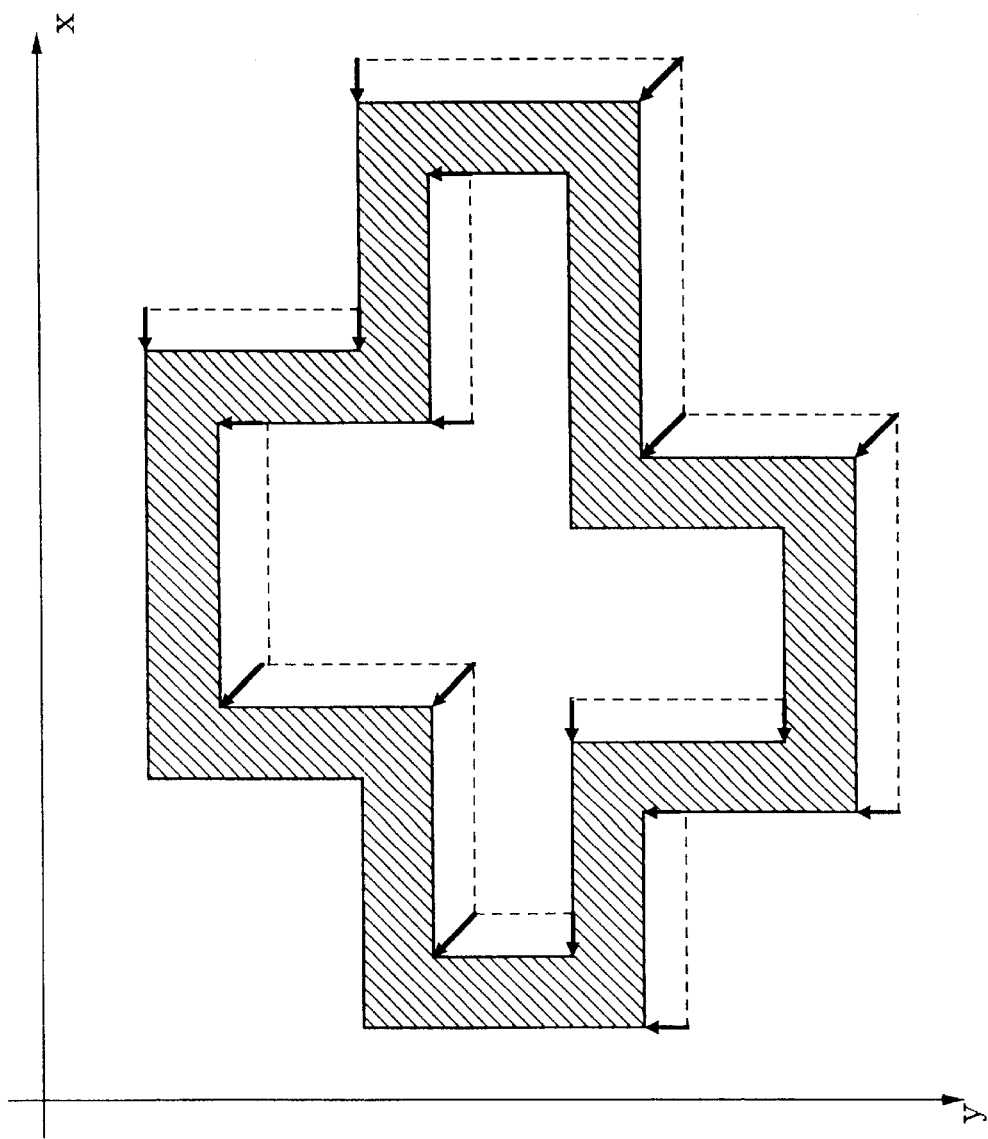
FIG. 19 is a view showing an example of the result of the vertex point adjustment processing.

FIGS. 17 to 19 show the above-mentioned vertex point adjustment processing results for vertex points after the smoothing/variable-magnification processing. In FIGS. 17 to 19, the dotted line indicates a figure defined by vertex points before the vertex point adjustment processing, and the solid line indicates a figure defined by edge points after the edge point adjustment processing. In addition, arrows indicate the adjustment directions of vertex points.

Vertex points to be adjusted by the vertex point adjustment processing will be explained below with reference to FIG. 17. An image of a rectangle having a predetermined width shown in FIG. 17 includes the eight different edge vector connection patterns, as shown in FIGS. 8A to 9H.

Vertex points P101 to P104 that constitute the outer frame of the rectangle will be described below. The vertex point P101 corresponds to the connection pattern shown in FIG. 8A, and its coordinate values are not adjusted. Since the vertex points P102, P103, and P104 respectively correspond to the connection patterns shown in FIGS. 8B, 8C, and 8D, their coordinate values are subjected to predetermined adjustment. If this adjustment is considered separately in the x- and y-axes, vertex points whose coordinates are to be adjusted in the horizontal direction are the two points P102 and P103, and vertex points whose coordinates are to be adjusted in the vertical direction are the two points P103 and P104. More specifically, the vertex points P102 and P103, which are in shade when the rectangle defined by P101 to P104 is projected onto the y-axis, become those to be adjusted in the horizontal direction, and the vertex points P103 and P104, which are in shade when the rectangle defined by P101 to P104 is projected onto the x-axis, become those to be adjusted in the vertical direction.

Vertex points P105 to P108 that constitute the inner frame of the rectangle will be explained below. The vertex point P107 corresponds to the connection pattern shown in FIG. 9B, and its coordinate values are not adjusted. Since the vertex points P105, P106, and P108 respectively correspond to the connection patterns shown in FIGS. 9D, 9A, and 9C, their coordinate values are adjusted. If this adjustment is considered separately in the x- and y-axes, vertex points whose coordinates are to be adjusted in the horizontal direction are the two points P105 and P108, and vertex points whose coordinates are to be adjusted in the vertical direction are the two points P105 and P106. More specifically, the vertex points P105 and P108, which are not in shade when the rectangle defined by P105 to P108 is projected onto the y-axis, become those to be adjusted in the horizontal direction, and the vertex points P105 and P106, which are not in shade when the rectangle defined by P105 to P108 is projected onto the x-axis, become those to be adjusted in the vertical direction.

More specifically, in the case of such a figure, the connection patterns shown in FIGS. 8A to 9H can be classified on the basis of whether or not a vertex point is in shade when a figure constituted by an edge vector loop is projected onto the x- or y-axis. In this case, as for vertex points constituting the outer frame of the rectangle, the shaded vertex points are adjusted. However, as for vertex points constituting the inner frame of the rectangle, non-shaded vertex points are adjusted.

With the above-mentioned vertex point adjustment processing, an increase in line width or a deformation of an image after variable-magnification processing can be suppressed.

[Second Embodiment]

In the description of the first embodiment, the direction of each edge vector is standardized in a direction to trace the vector while always observing a black pixel region on its right side. However, the present invention is not limited to this direction of the edge vector. That is, the present invention may be applied to a case wherein the direction of each edge vector is standardized in a direction to trace the vector while always observing a black pixel region on its left side.

When the direction of each edge vector is standardized in a direction to trace the vector while always observing a black pixel region on its left side, the connection patterns of edge vectors can be classified into eight patterns shown in FIGS. 20A to 20D and FIGS. 21A to 21D. FIGS. 20A to 21H respectively correspond to FIGS. 8A to 9H according to the first embodiment, except that the direction of each edge vector is reversed. Note that the definition of the orthogonal coordinate system is the same as that in the first embodiment.

Figure 20A:
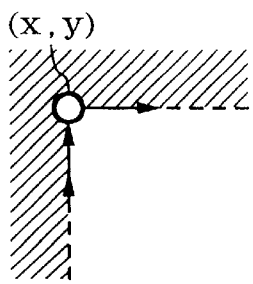
FIGS. 20A to 20H are first views showing connection patterns of vertex points and vertex point adjustment processing according to the second embodiment of the present invention.
Figure 20E:
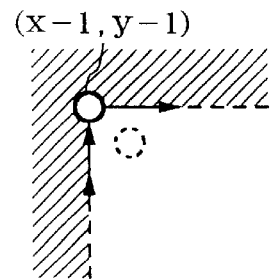

FIG. 20A shows a case wherein an upward vector is connected to a rightward vector while forming an apex angle of 270° therebetween. The vertex point adjustment processing in this case subtracts 1 from both the x- and y-coordinate values of a vertex point present between the two vectors, which point serves as both the end point of the upward vector and the start point of the rightward vector. The coordinate values of the processed vertex point are as shown in FIG. 20E.

Figure 20B:
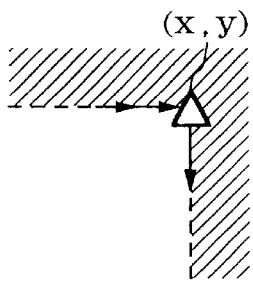
Figure 20F:
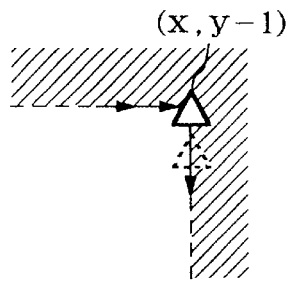

FIG. 20B shows a case wherein a rightward vector is connected to a downward vector while forming an apex angle of 270° therebetween. The vertex point adjustment processing in this case does not change the x-coordinate value of a vertex point present between the two vectors, which point serves as both the end point of the rightward vector and the start point of the downward vector, and subtracts 1 from the y-coordinate value of the vertex point. The coordinate values of the processed vertex point are as shown in FIG. 20F.

Figure 20C:
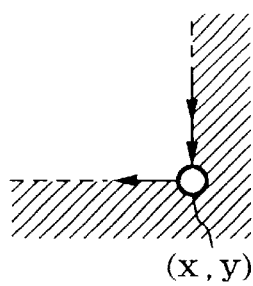
Figure 20G:
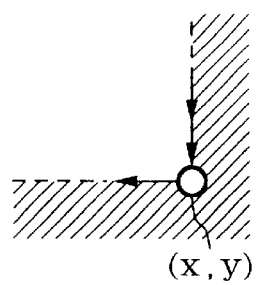

FIG. 20C shows a case wherein a downward vector is connected to a leftward vector while forming an apex angle of 270° therebetween. The edge point adjustment processing in this case changes neither the x-coordinate value nor the y-coordinate value of an edge point present between the two vectors, which point serves as both the end point of the downward vector and the start point of the leftward vector. The coordinate values of the processed edge point are as shown in FIG. 20G.

Figure 20D:
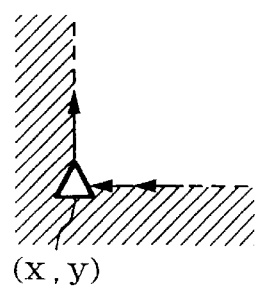
Figure 20H:
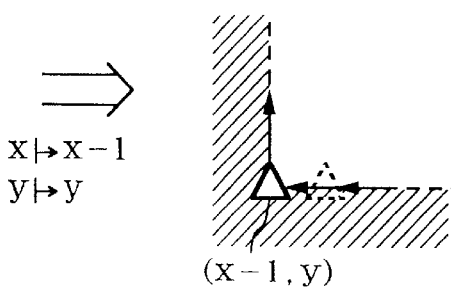

FIG. 20D shows a case wherein a leftward vector is connected to an upward vector while forming an apex angle of 270° therebetween. The edge point adjustment processing in this case subtracts 1 from the x-coordinate value of an edge point present between the two vectors, which point serves as both the end point of the leftward vector and the start point of the upward vector, and does not change the y-coordinate value of the edge point. The coordinate values of the processed edge point are as shown in FIG. 20H.

Figure 21A:
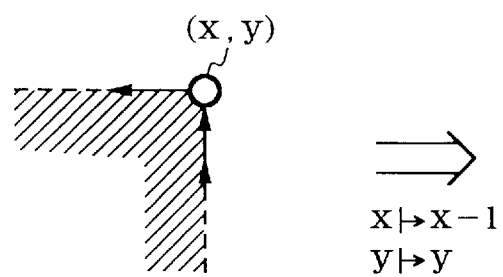
FIGS. 21A to 21H are second views showing connection patterns of edge points and edge point adjustment processing according to the second embodiment of the present invention.
Figure 21E:
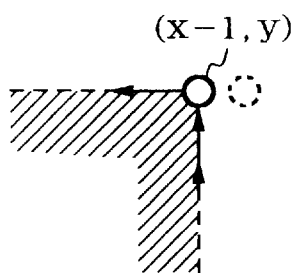

FIG. 21A shows a case wherein an upward vector is connected to a leftward vector while forming an apex angle of 90° therebetween. The vertex point adjustment processing in this case subtracts 1 from the x-coordinate value of an vertex point present between the two vectors, which point serves as both the end point of the upward vector and the start point of the leftward vector, and does not change the y-coordinate value of the vertex point. The coordinate values of the processed vertex point are as shown in FIG. 21E.

Figure 21B:
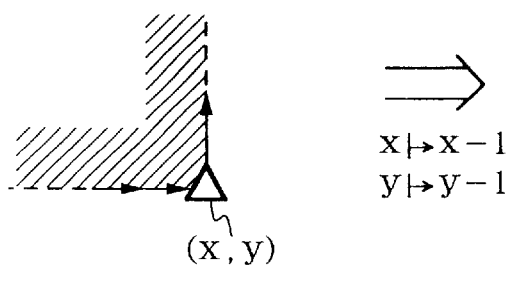
Figure 21F:
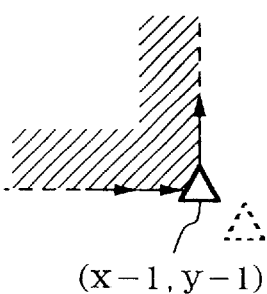

FIG. 21B shows a case wherein a rightward vector is connected to an upward vector while forming an apex angle of 90° therebetween. The vertex point adjustment processing in this case subtracts 1 from both the x- and y-coordinate values of a vertex point present between the two vectors, which point serves as both the end point of the rightward vector and the start point of the upward vector. The coordinate values of the processed vertex point are as shown in FIG. 21F.

Figure 21C:
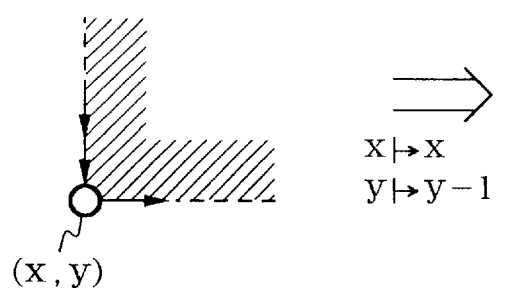
Figure 21G:
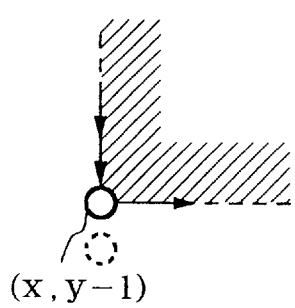

FIG. 21C shows a case wherein a downward vector is connected to a rightward vector while forming an apex angle of 90° therebetween. The vertex point adjustment processing in this case does not change the x-coordinate value of a vertex point present between the two vectors, which point serves as both the end point of the downward vector and the start point of the rightward vector, and subtracts 1 from the y-coordinate value of the vertex point. The coordinate values of the processed vertex point are as shown in FIG. 21G.

Figure 21D:
Figure 21H:
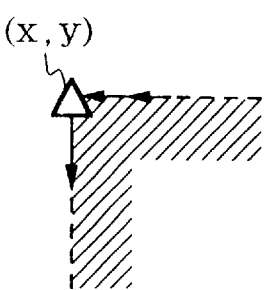

FIG. 21D shows a case wherein a leftward vector is connected to a downward vector while forming an apex angle of 90° therebetween. The vertex point adjustment processing in this case changes neither the x-coordinate value nor the y-coordinate value of a vertex point present between the two vectors, which point serves as both the end point of the leftward vector and the start point of the downward vector. The coordinate values of the processed vertex point are as shown in FIG. 21H.

Figure 22:
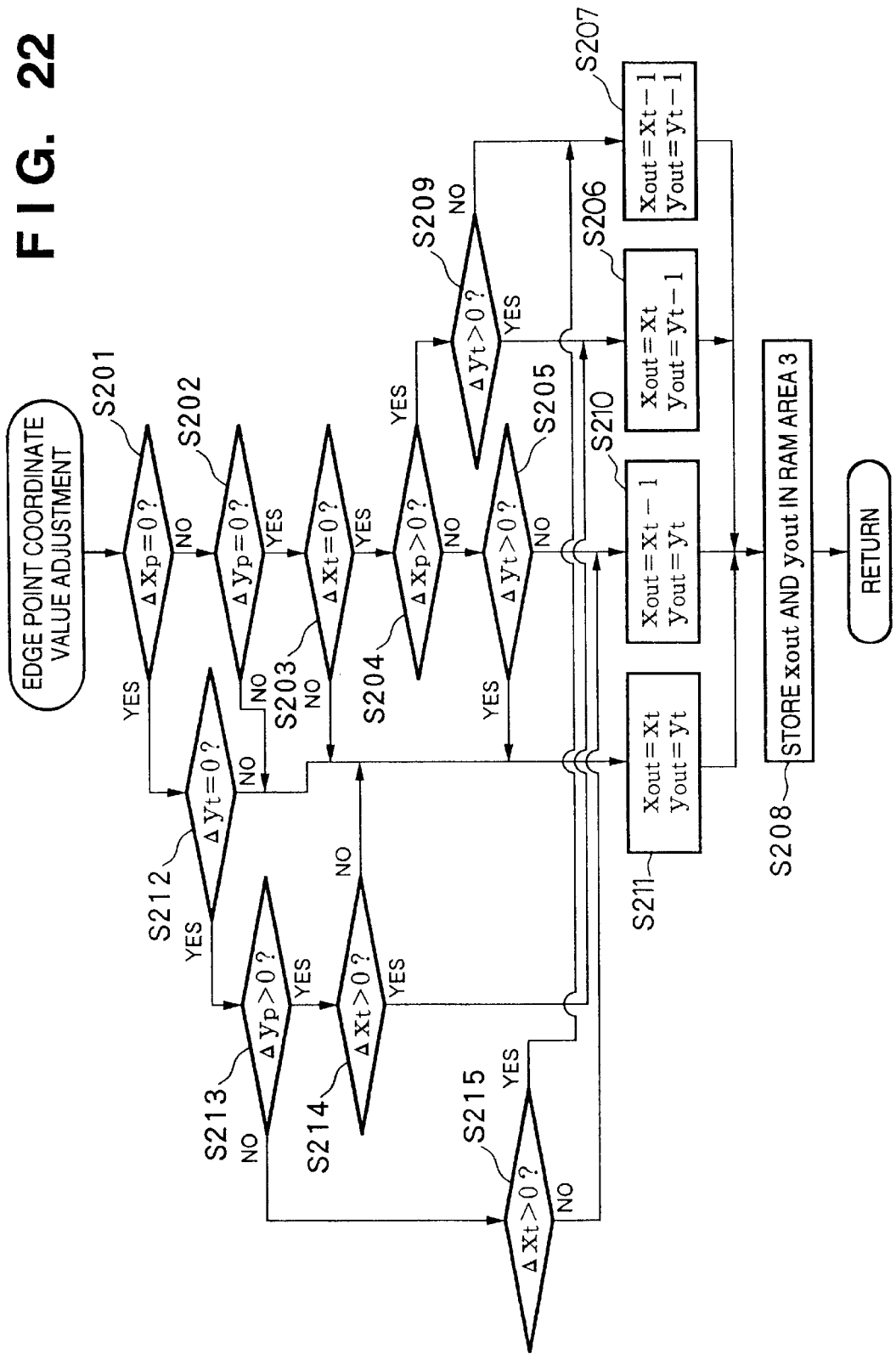
FIG. 22 is a flow chart showing the flow of the processing of an vertex point coordinate value adjustment routine (step S105) according to the second embodiment.

FIG. 22 is a flow chart showing the flow of the processing of the vertex point coordinate value adjustment routine (step S105). In this embodiment, since the direction of an edge vector is reversed to that in the first embodiment, the flow of the vertex point adjustment processing is very similar to that in the first embodiment. The same step numbers in FIG. 22 denote steps of performing processing similar to that in the first embodiment in principle. Even in a step with the same step number, the branch destination of the step may not always be the same.

[Third Embodiment]

In the above embodiments, the data format shown in FIG. 15 is used as the format of edge vector data, and all edge vector data are simultaneously input/output via the signal lines 109 and 110. For example, edge vector data may be input/output as follows. That is, a group of edge vector data need not always be simultaneously input/output, as described above. For example, after the number of loops in an image and the respective intra-loop vertex count tables are input initially, vertex coordinate tables may be input one by one as needed in the order of vertices in the loop of interest, and new vertex coordinate values may be input each time one edge vector is processed.

Alternatively, the number of loops in an image and the number of vertices in the 0-th loop may be initially input, and data of vertices may be input one by one as needed in the order of vertices in the 0-th loop to process each vertex point. Upon completion of the processing for the 0-th loop, the number of vertices in the first loop may be input, and data of vertices may be processed as needed in the order of vertices in the first loop. Subsequently, the number of vertices may be input in units of loops. The same applies to the output operation.

The format of edge vector data may be modified as follows. That is, a special code (for example, a coordinate system is defined so that both the x- and y-coordinate values have their significant coordinate value ranges in positive ranges, and the special code is defined by vertex coordinate value data having coordinate values x=−1 and y=−1) indicating the end of a vertex train that forms an edge vector loop may be added to the end of a vertex coordinate train of one group, and the intra-loop vertex count tables shown in FIG. 15 may be omitted. The number of loops in an image may also be omitted by adding a special code indicating the end of processing of all the loops. In this case, the vertex point adjustment unit 100 may be arranged to process vertex coordinate values in the coupling order of vertex points on the loop in units of edge vector loops.

[Fourth Embodiment]

Figure 25:
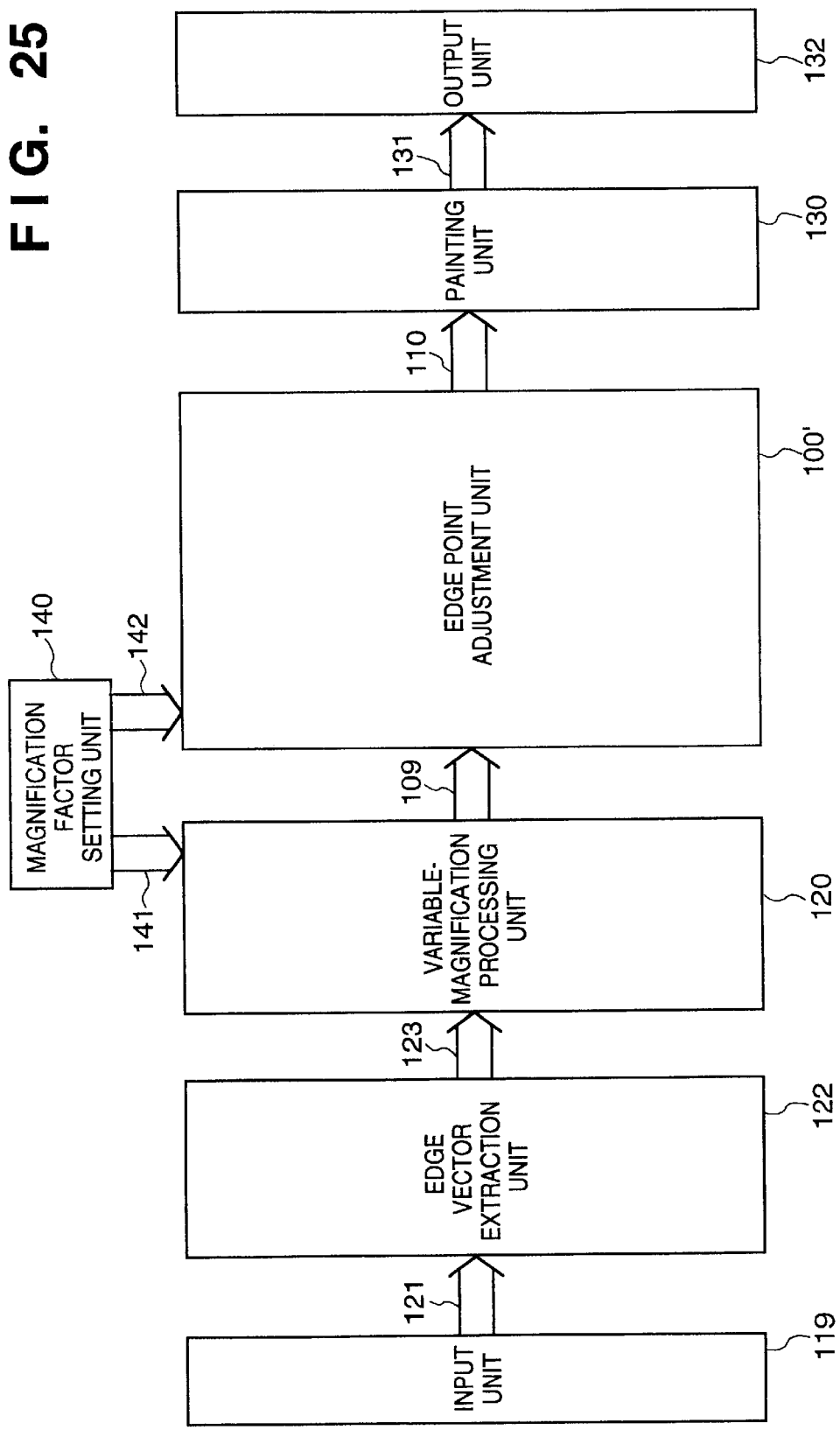
FIG. 25 is a block diagram showing the arrangement of an outline smoothing/variable-magnification processing apparatus according to the fourth embodiment of the present invention.

In this embodiment, whether or not a vertex point subjected to the variable-magnification processing at a selected magnification factor in a variable-magnification processing unit is to be adjusted by a vertex point adjustment unit is determined in accordance with the selected magnification factor. FIG. 25 is a block diagram showing the arrangement of an outline smoothing/variable-magnification processing apparatus according to this embodiment. The same reference numerals in FIG. 25 denote the same parts as in the block diagram in FIG. 1, and a detailed description thereof will be omitted.

Based on the magnification factor supplied from the magnification factor setting unit 140 via a signal line 142, a vertex point adjustment unit 100' discriminates whether or not vertex point adjustment processing (see FIG. 14) is to be performed. If the input magnification factor falls within a predetermined range (e.g., less than ×2.5), the unit 100' executes the same vertex point adjustment processing as that of the vertex point adjustment unit 100 in the first embodiment; if the magnification factor falls outside the range, the unit 100' does not execute the vertex point adjustment processing, and directly supplies edge vector data input from the variable-magnification processing unit 123 to the painting unit 130.

Figure 26:
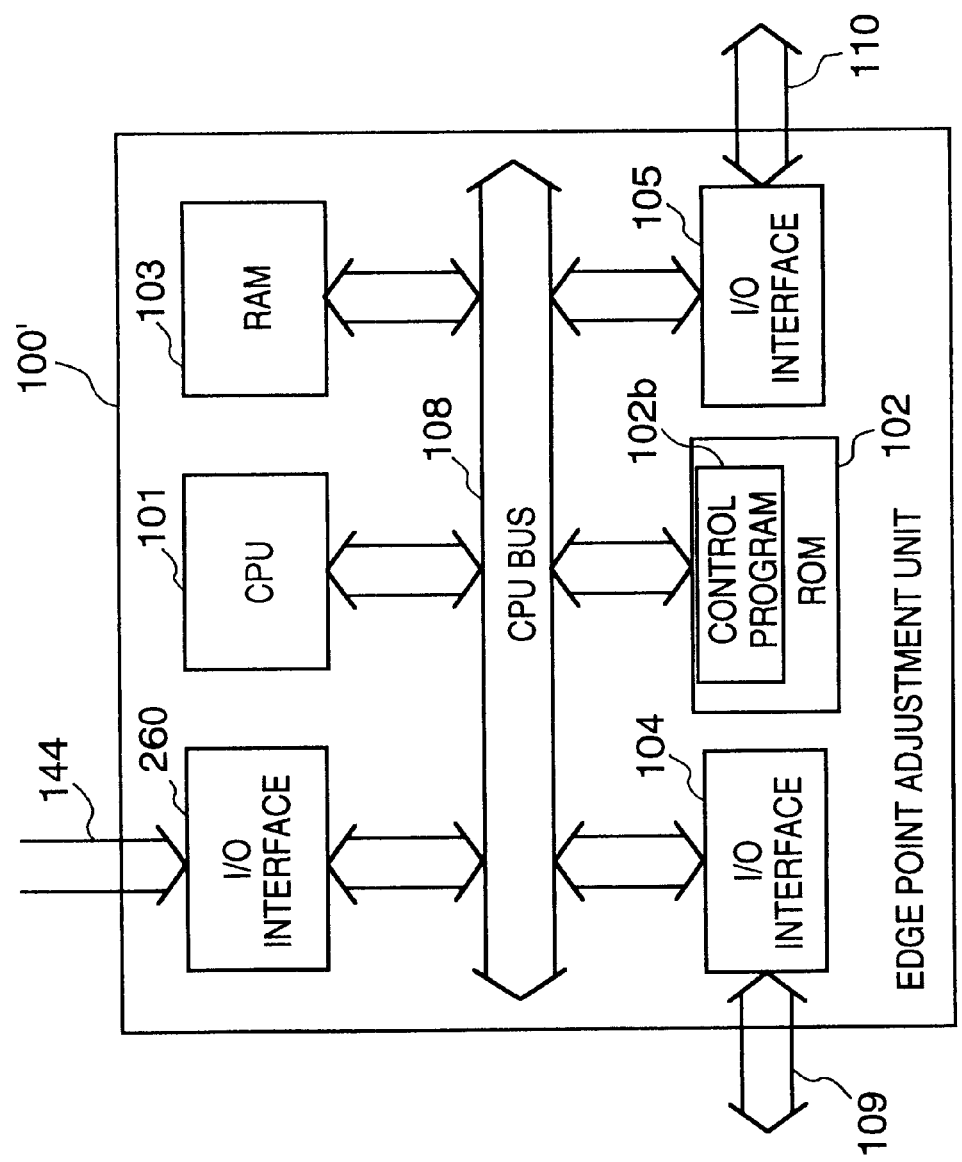
FIG. 26 is a block diagram showing the arrangement of a vertex point adjustment unit 100'.

FIG. 26 is a block diagram showing the arrangement of the vertex point adjustment unit 100'. The same reference numerals in FIG. 26 denote the same parts as in the vertex point adjustment unit 100 shown in FIG. 1, and a detailed description thereof will be omitted. In the vertex point adjustment unit 100' of this embodiment, an I/O interface 260 is added to the vertex point adjustment unit 100 shown in FIG. 1, and the control program 102a is replaced by a control program 102b. The I/O interface 260 is connected to a control unit 143, and acquires a magnification factor supplied via a signal line 144.

Figure 27:
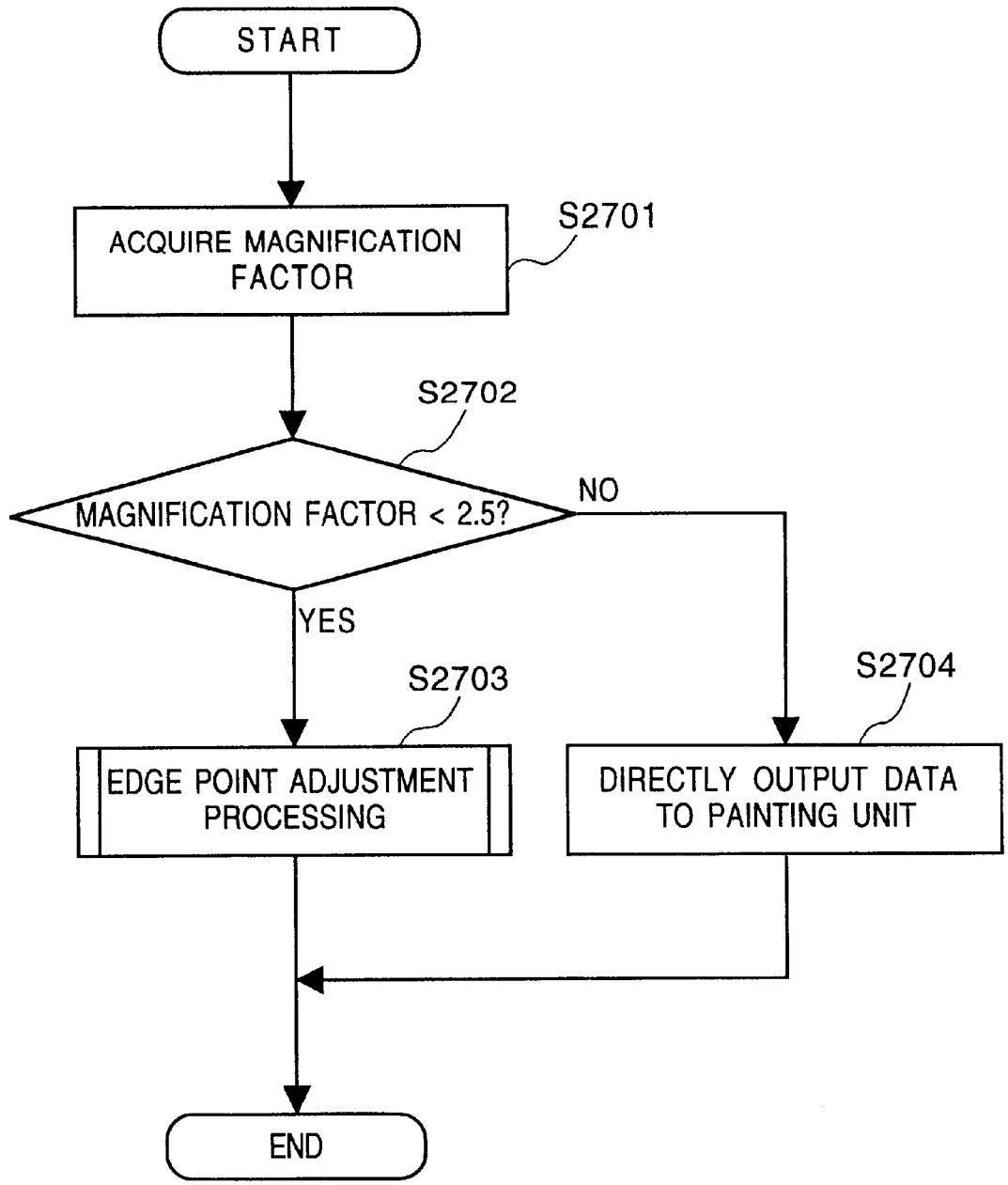
FIG. 27 is a flow chart showing the flow of the operation of the vertex point adjustment unit 100'.

FIG. 27 is a flow chart showing the flow of the operation of the vertex point adjustment unit 100'. The processing associated with this flow chart is executed by the CPU 101 on the basis of the control program 102b. Note that the control program 102b may be supplied from an external device by means of, e.g., a floppy disk.

In step S2701, the magnification factor is acquired from the magnification factor setting unit 140. In step S2702, it is checked if the acquired magnification factor is smaller than a discrimination value (2.5). If the magnification factor is smaller than 2.5, the flow advances to step S2703 to execute the vertex point adjustment processing. The vertex point adjustment processing in step S2703 is the same as that executed by the vertex point adjustment unit 100 in the first embodiment (see FIG. 14). On the other hand, if the magnification factor is equal to or larger than 2.5, the flow advances to step S2704, and edge vector data supplied from the variable-magnification processing unit 120 are directly supplied to the painting unit 130.

As described above, in this embodiment, only when the magnification factor is smaller than the discrimination value, the vertex point adjustment processing is executed. This is because a relatively thicker image is reproduced as the magnification factor is lower. Note that the discrimination value may be arbitrarily determined in correspondence with an input image to be processed.

For the sake of simplicity, the edge vector extraction unit 12, the variable-magnification processing unit 120, the vertex point adjustment unit 100', the painting unit 130, and the like have been separately explained. Alternatively, an outline smoothing/variable-magnification processing apparatus may be constituted by supplying a control program for executing edge vector extraction processing, variable-magnification processing, vertex point adjustment processing, and painting processing to a single CPU system.

Figure 28:
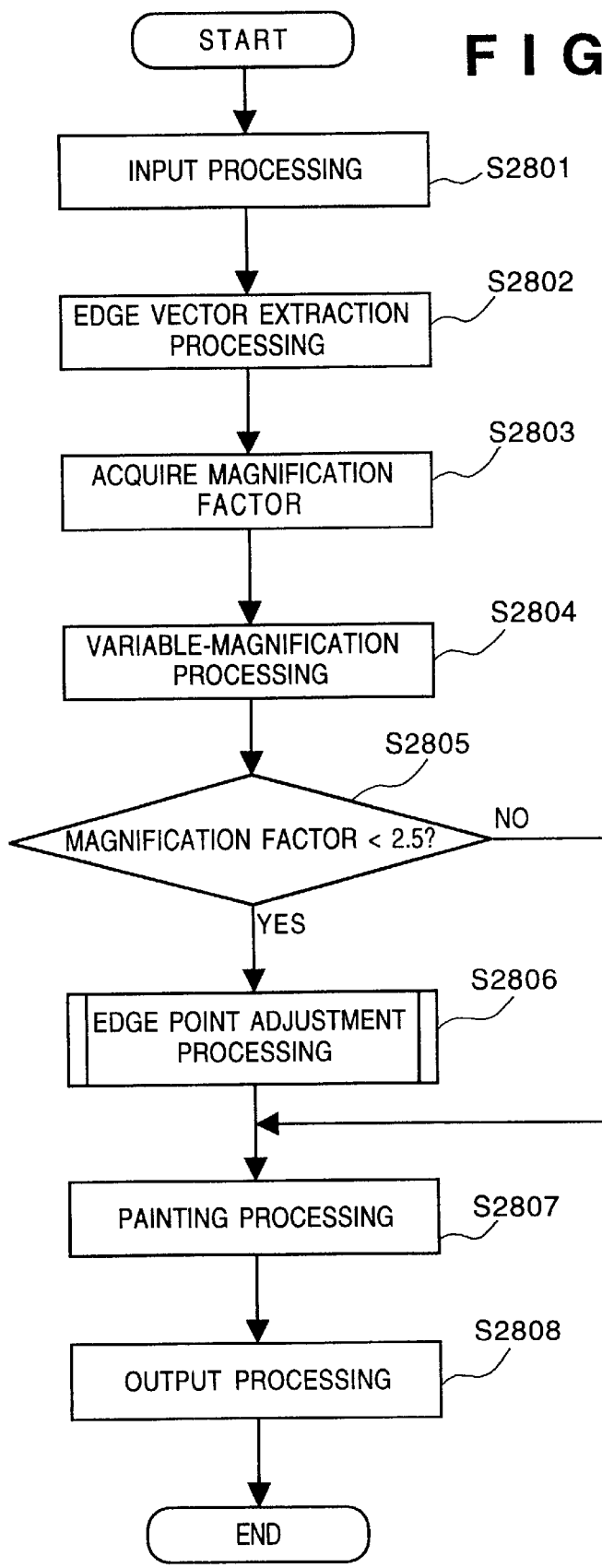
FIG. 28 is a flow chart showing an example of processing executed when the outline smoothing/variable-magnification processing apparatus according to the fourth embodiment is realized in a software manner.

FIG. 28 is a flow chart showing the operation of the overall outline smoothing/variable-magnification processing apparatus. Input processing in step S2801 is processing for controlling the input unit 119 to input an image. Edge vector extraction processing in step S2082 corresponds to the processing in the edge vector extraction unit 122. Magnification factor acquisition processing in step S2803 is processing for acquiring a magnification factor from the magnification factor setting unit 140. Variable-magnification processing in step S2804 corresponds to processing in the variable-magnification processing unit 120. Magnification factor discrimination processing in step S2805 and vertex point adjustment processing in step S2806 correspond to processing in the vertex point adjustment unit 100'. Painting processing in step S2807 corresponds to processing in the painting unit 130. Output processing in step S2808 controls the output unit 132 to output an image.

Figure 29:
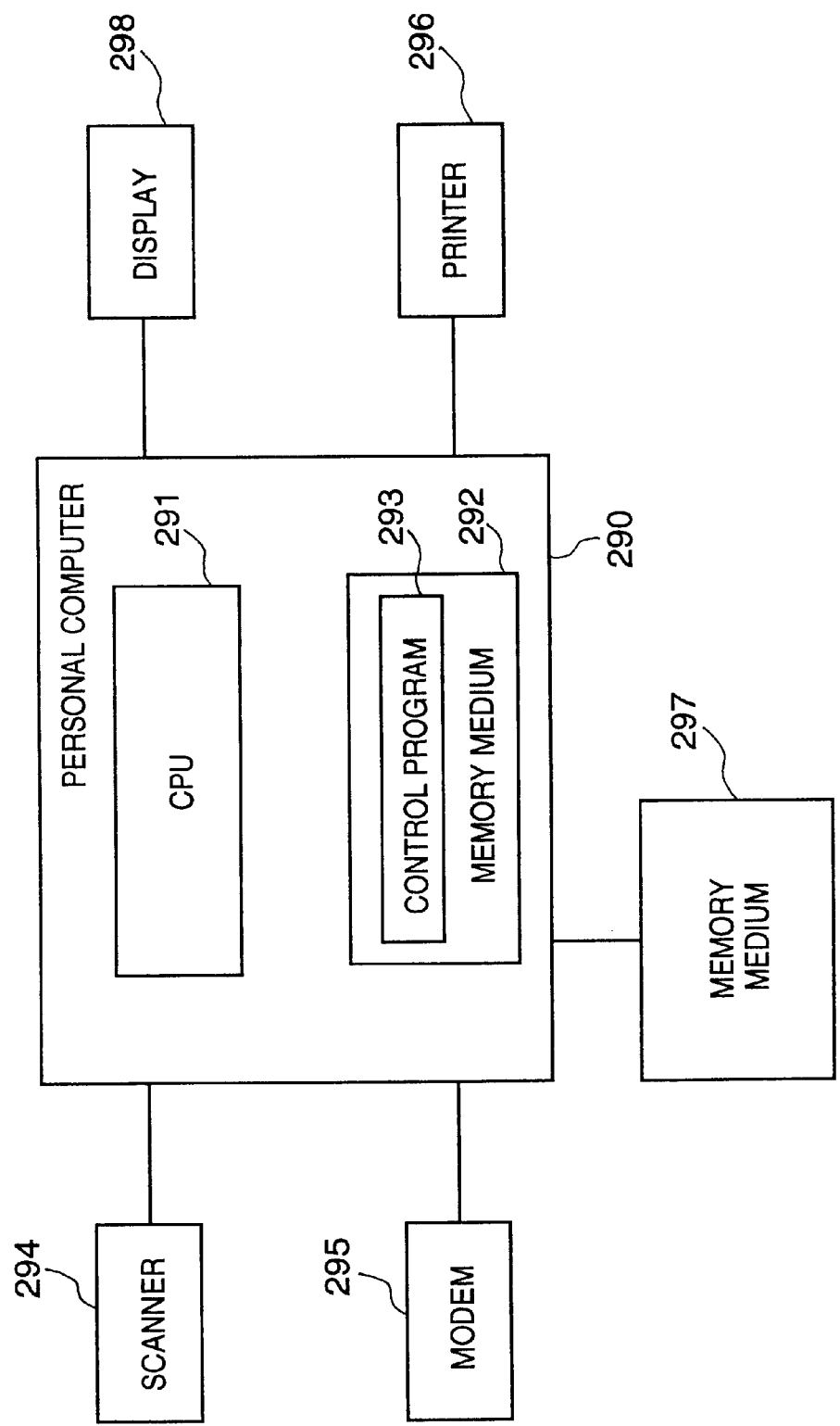
FIG. 29 is a block diagram showing an example of the system arrangement which realizes an outline smoothing/variable-magnification processing apparatus by providing a software program.

FIG. 29 is a diagram showing an example of the system arrangement that realizes an outline smoothing/variable-magnification processing apparatus by providing a software program. A personal computer 290 comprises a function of the above-mentioned outline smoothing/variable-magnification processing apparatus by loading a control program 293 (e.g., a program corresponding to the flow chart shown in FIG. 28) stored in a memory medium 292 onto a CPU 291. A scanner 294 and a modem 295 correspond to the input unit 119, and have a function of inputting an image in step S2801. A printer 296 and a display 298 correspond to the above-mentioned output unit 132, and have a function of outputting an image in step S2808. An image may be input/output to/from a memory medium 297 such as a hard disk device. An input image may have a format of edge vector data (e.g., outline data obtained by storing, in the memory medium 297, vector data obtained by performing processing for extracting edge vectors of an image in advance).

Note that the outline smoothing/variable-magnification processing apparatus realized in a software manner may be applied to other embodiments, as a matter of course.

[Fifth Embodiment]

In this embodiment, when the magnification factor is 1 (equal magnification), edge vector data extracted by the edge vector extraction unit 122 are directly supplied to the vertex point adjustment unit 100' and are subjected to vertex point adjustment processing without being subjected to variable-magnification processing in the variable-magnification processing unit 120 shown in FIG. 25.

Figure 30:
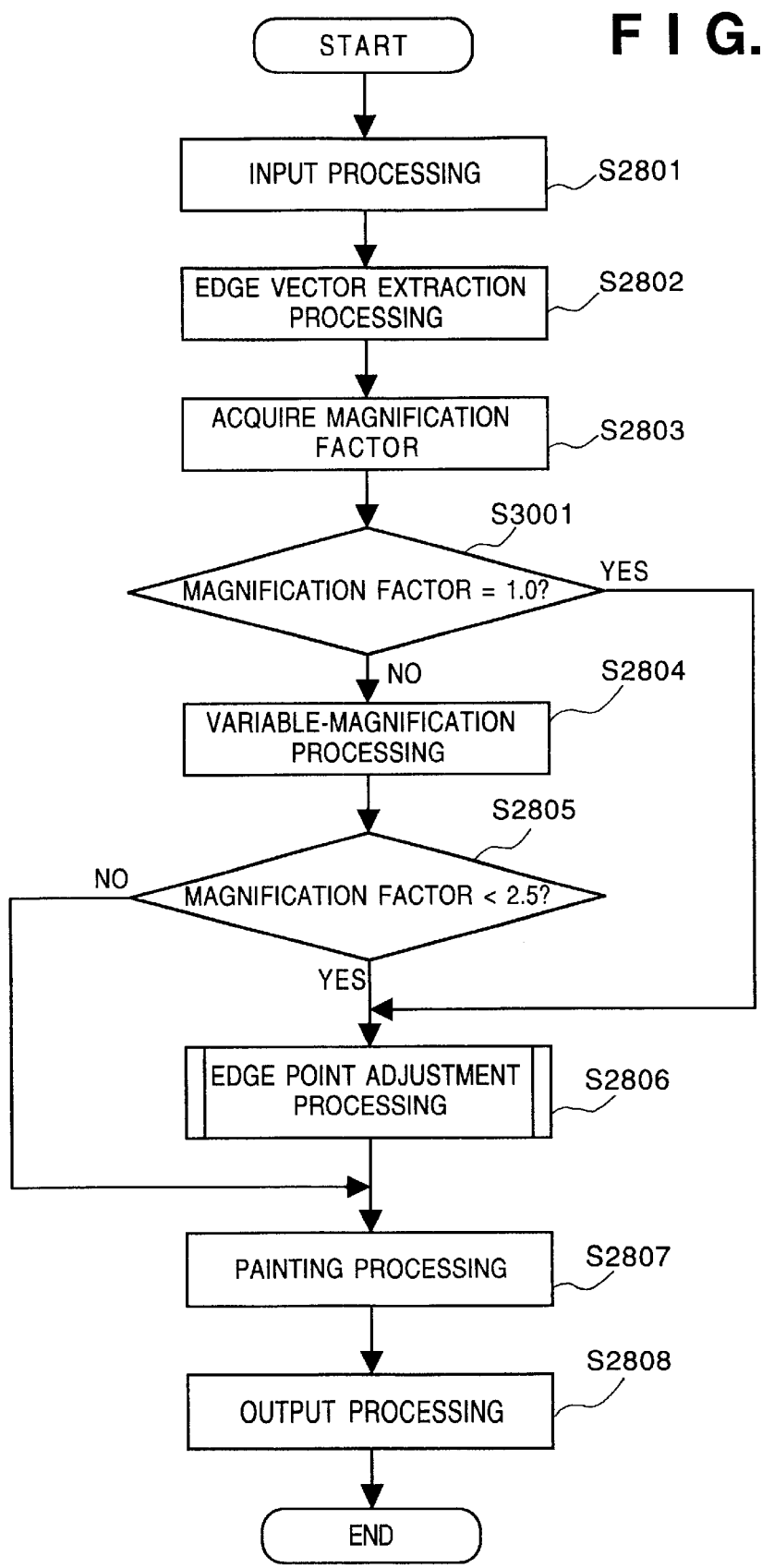
FIG. 30 is a flow chart showing an example of the operation of an outline smoothing/variable-magnification processing apparatus according to the fifth embodiment of the present invention.

FIG. 30 is a flow chart showing the operation of an outline smoothing/variable-magnification processing apparatus of this embodiment. For example, in the outline smoothing/variable-magnification processing apparatus shown in FIG. 25, control corresponding to this embodiment may be executed by a control unit (not shown). When a control program corresponding to this flow chart is provided as the control program 293 shown in FIG. 29, the outline smoothing/variable-magnification processing apparatus according to this embodiment can be realized in a software manner.

In the flow chart shown in FIG. 30, step S3001 is added to the flow chart shown in FIG. 28. The same step numbers in FIG. 30 denote the same steps as those in the flow chart shown in FIG. 28, and a detailed description thereof will be omitted.

After the magnification factor is acquired in step S2803, it is checked in step S3001 if the magnification factor is 1 (equal magnification). If the magnification factor is 1, the flow directly advances to step S2806 while skipping the variable-magnification processing in step S2804, and the vertex point adjustment unit 100' executes the vertex point adjustment processing.

According to this embodiment, upon reproduction at an equal magnification, since an input image is not subjected to smoothing/variable-magnification processing in the variable-magnification processing unit 120, an original image can be faithfully reproduced, and the time required for the variable-magnification processing in the variable-magnification processing unit 120 can be omitted. As is apparent from the description of the first embodiment, even upon reproduction at an equal magnification, an output image faithful to an original image, i.e., an ideal output image determined by the original image and the magnification factor (1 in this case) can be obtained by the vertex point adjustment processing.

As described above, this embodiment is particularly effective when an input image is supplied as edge vector data such as outline data obtained by storing, in the memory medium 297, vector data obtained by performing processing for extracting edge vectors of an image in advance. This is because an image faithful to an original image (equal to an original image) is to be desirably reproduced and output when an input image in the raster format is reproduced at an equal magnification.

[Sixth Embodiment]

In this embodiment, when the magnification factor is 1 (equal magnification), edge vector data extracted by the edge vector extraction unit 122 are directly supplied to the vertex point adjustment unit 100' and are subjected to vertex point adjustment processing without being subjected to variable-magnification processing in the variable-magnification processing unit 120 shown in FIG. 25. On the other hand, when the magnification factor is other than 1 (equal magnification), edge vector data are subjected to the variable-magnification processing in the variable-magnification processing unit 120, but are not subjected to vertex point adjustment processing.

Figure 31:
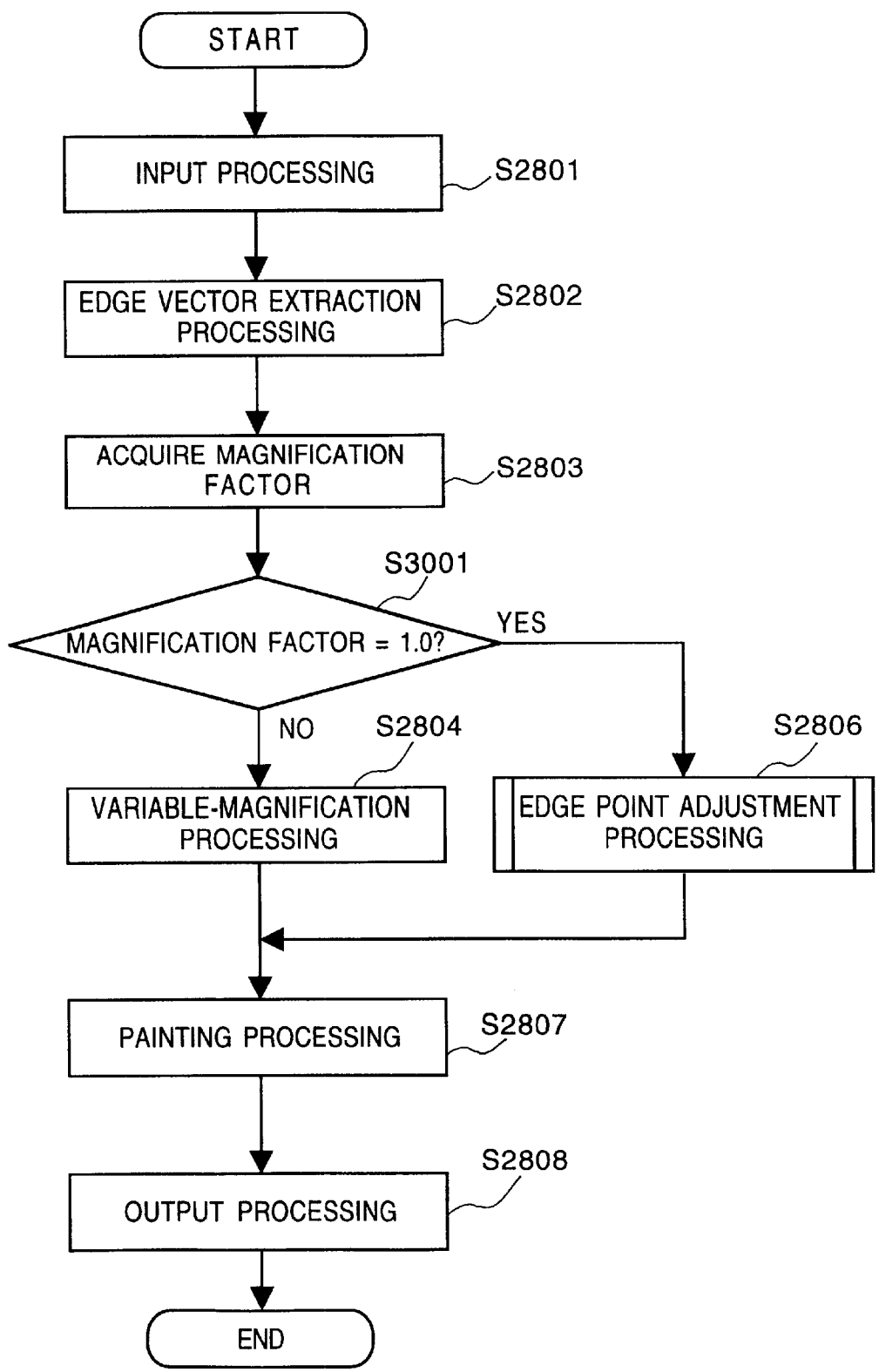
FIG. 31 is a flow chart showing an example of the operation of an outline smoothing/variable-magnification processing apparatus according to the sixth embodiment of the present invention.

FIG. 31 is a flow chart showing the operation of an outline smoothing/variable-magnification processing apparatus of this embodiment. For example, in the outline smoothing/variable-magnification processing apparatus shown in FIG. 25, control corresponding to this embodiment may be executed by a control unit (not shown). When a control program corresponding to this flow chart is provided as the control program 293 shown in FIG. 29, the outline smoothing/variable-magnification processing apparatus according to this embodiment can be realized in a software manner.

In the flow chart shown in FIG. 31, the processing sequence shown in the flow chart in FIG. 30 is modified. Note that the same step numbers in FIG. 31 denote the same steps as those in the flow chart shown in FIG. 30, and a detailed description thereof will be omitted.

After the magnification factor is acquired in step S2803, it is checked in step S3001 if the magnification factor is 1 (equal magnification). If the magnification factor is 1, the flow directly advances to step S2806 without executing the variable-magnification processing, and the vertex point adjustment unit 100' executes the vertex point adjustment processing. On the other hand, if the magnification factor is other than 1 (equal magnification), the flow advances to step S2804 to perform the variable-magnification processing by the variable-magnification processing unit 120. In this case, the processed data are subjected to painting processing in step S2807 without being subjected to the vertex point adjustment processing.

This embodiment is particularly effective when edge vectors supplied from the edge vector extraction unit 122 or edge vectors generated by the variable-magnification processing unit 120 include patterns other than combinations of vertical and horizontal vectors. The reason for this effect will be explained below.

For example, assuming that edge vectors extracted by the edge vector extraction unit 122, edge vectors acquired by the input unit 119, or edge vectors generated by the variable-magnification processing unit 120 include edge vectors other than vertical and horizontal vectors (e.g., oblique vectors), connection patterns of edge vectors, which do not correspond to those shown in FIGS. 8A to 9H may be present.

In this case, the above-mentioned vertex point adjustment processing is not applied to some vertex points. As a result, an output image deforms due to mixing of a portion which is subjected to the vertex point adjustment processing and has a proper width, and a portion whose line width has increased/decreased since no vertex point adjustment processing is applied. In order to avoid such undesirable result, the connection patterns of edge vector may include those associated with oblique edge vectors. However, in this case, processing is complicated.

In view of this problem, with a simple method of this embodiment, the vertex point adjustment processing is applied upon reproduction at an equal magnification so as to generate an output image faithful to the input image (i.e., an ideal output image determined by an original image and the magnification factor). On the other hand, at a magnification factor other than equal magnification, the vertex point adjustment processing is not performed to allow a uniform increase/decrease in line width of an output image.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU, MPU, or the like) of the system or apparatus, needless to say.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

Needless to say, the functions of the above-mentioned embodiment may be realized not only by executing the readout program code by the computer but also by some or all of actual processing operations executed by an OS (operating system) running on the computer on the basis of an instruction of the program code.

Furthermore, needless to say, the functions of the above-mentioned embodiments may be realized by some or all of actual processing operations executed by a CPU or the like arranged in a function extension board or a function extension unit, which is inserted in or connected to the computer and receives the program code read out from the storage medium.

When the present invention is applied to the storage medium, the storage medium stores program codes corresponding to the above-mentioned flow charts. An example of the storage medium will be described below.

Figure 32:
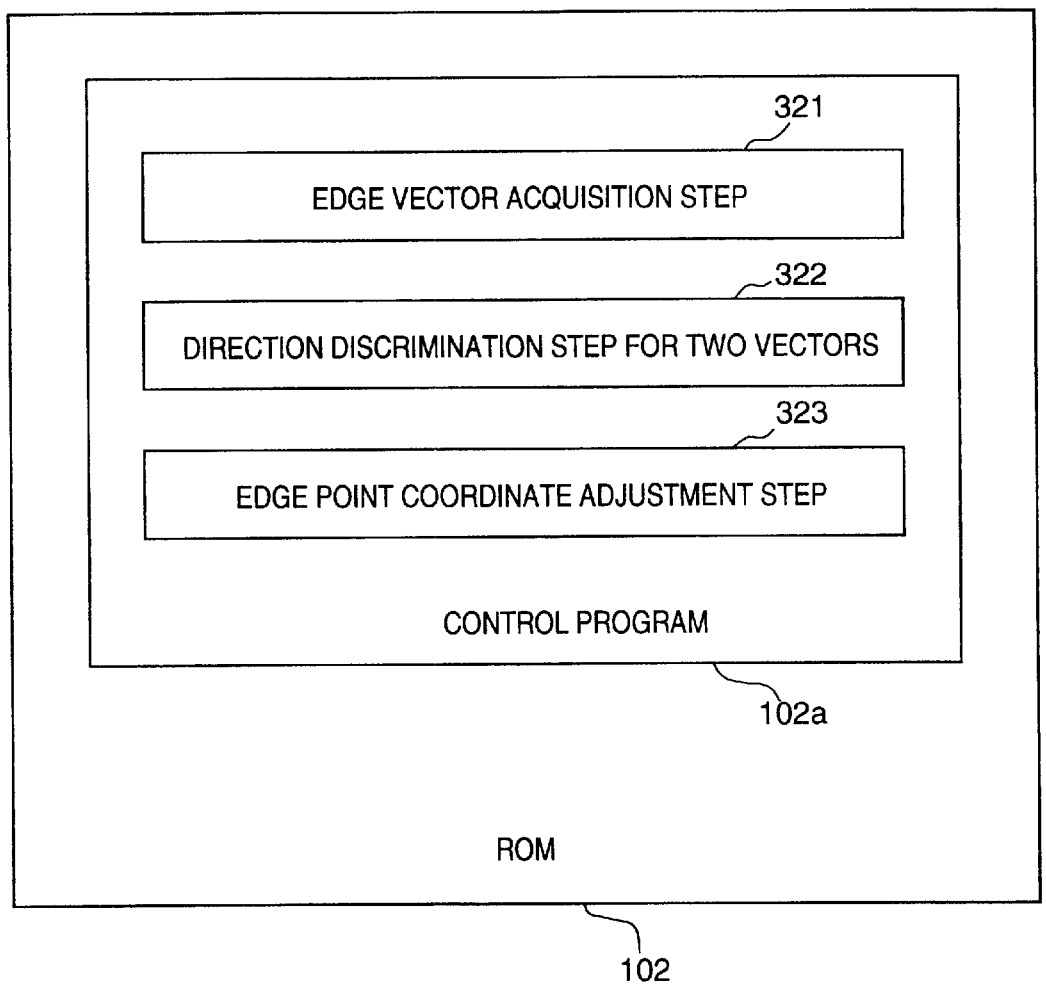
FIG. 32 shows the memory map corresponding to a control program 102a which defines the function of the vertex point adjustment unit 100.

FIG. 32 shows the memory map corresponding to the control program 102a which defines the functions of the vertex point adjustment unit 100. A module 321 of the edge vector acquisition step corresponds to step S101. A module 322 of the step of discriminating the directions of two vectors corresponds to steps S201 to S205, S209, and S212 to S215. A module 323 of the vertex point coordinate adjustment step corresponds to steps S206 to S208, S210, and S211.

Figure 33:
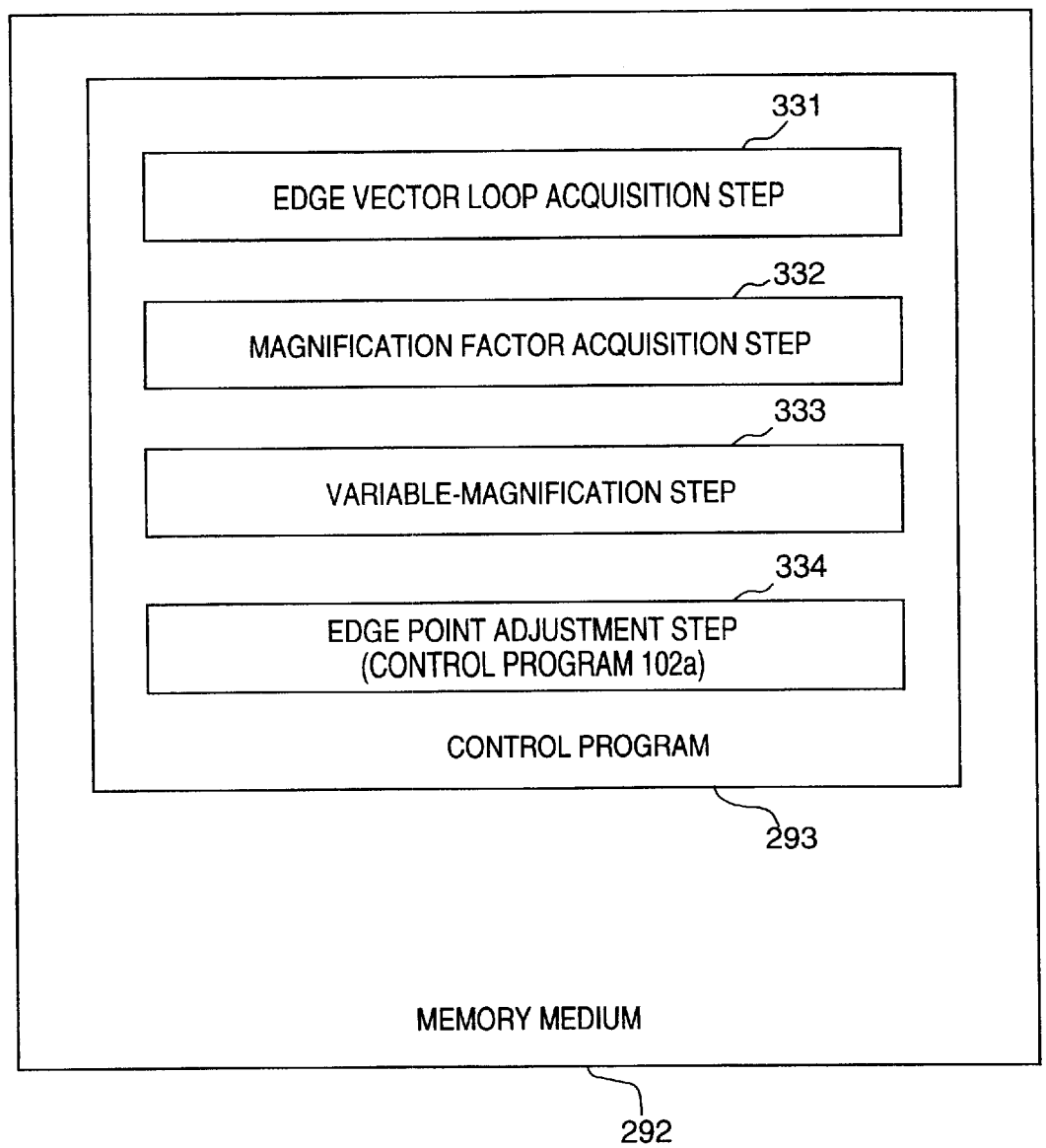
FIG. 33 shows the memory map corresponding to a control program 293 which defines an outline smoothing/variable-magnification processing apparatus.

FIG. 33 shows the memory map corresponding to the control program 293 for defining the functions of the outline smoothing/variable-magnification processing apparatus. A module 331 of the edge vector loop acquisition step corresponds to steps S2801 and S2802. A module 332 of the magnification factor acquisition (setting) step corresponds to step S2803. A module 333 of the variable-magnification step corresponds to step S2804. A module 334 of the vertex point adjustment step corresponds to step S2806 (control program 102a).

As described above, according to the present invention, a deformation of an output image can be suppressed.

The present invention is not limited to the above embodiments and various changes and modifications can be made within the spirit and scope of the present invention. Therefore, to apprise the public of the scope of the present invention the following claims are made.

What is claimed is:

1. An image processing apparatus, comprising:

extraction means for extracting edge vectors defined on a boundary between black and white pixel regions of an input image, wherein the edge vectors are constituted by a plurality of vertex points;

variable-magnification means for performing variable-magnification processing on the extracted edge vectors in accordance with a magnification factor;

adjustment means for adjusting the variable-magnified edge vectors; and reproduction means for reproducing the image on the basis of the adjusted edge vectors, wherein said adjustment means includes means for displacing vertex points selected from a plurality of vertex points constituting the variable-magnified edge vectors so that a width of a line, corresponding to the displaced vertex points, included in an image to be reproduced by said reproduction means is reduced by one pixel regardless of the orientation of the line corresponding to the displaced vertex points.

2. The apparatus according to claim 1, wherein said adjustment means selects vertex points of the edge vectors as vertex points of interest, so as to reduce the line width by one pixel and displaces a vertex point of interest in a case where a connection pattern of the two edge vectors which share the vertex point of interest matches any one of predetermined connection patterns.

3. The apparatus according to claim 2, wherein said adjustment means comprises:
   x-coordinate adjustment means for displacing, along an x-axis, the vertex point of interest in a direction to reduce an area of a figure surrounded by a loop which traces the vertex points of the edge vectors in a case where the connection pattern of the two edge vectors which share the vertex point of interest matches any one of the predetermined connection patterns; and
   y-coordinate adjustment means for displacing, along a y-axis, the vertex point of interest in a direction to reduce the area of the figure surrounded by the loop in a case where the connection pattern of the two edge vectors which share the vertex point of interest matches any one of the predetermined connection patterns.

4. The apparatus according to claim 3, wherein a displacement amount by each of said x- and y-coordinate adjustment means is one pixel.

5. The apparatus according to claim 4, further comprising painting means for painting a portion inside a loop which traces the vertex points whose coordinate positions are adjusted by said adjustment means.

6. The apparatus according to claim 5, further comprising output means for outputting an image generated by said painting means.

7. The apparatus according to claim 6, wherein said output means comprises a printer.

8. The apparatus according to claim 6, wherein said output means comprises a display device.

9. An image processing apparatus, comprising:
   extraction means for extracting edge vectors defined on a boundary between black and white pixel regions of an input image, wherein the edge vectors are constituted by a plurality of vertex points;
   variable-magnification means for performing variable-magnification processing on the extracted edge vectors in accordance with a magnification factor;
   determination means for determining whether or not the magnification factor is less than or equal to a predetermined value; and
   reproduction means for adjusting the variable-magnified edge vectors by displacing vertex points selected from a plurality of vertex points constituting the variable-magnified edge vectors and reproducing the image on the basis of the adjusted edge vectors in a case where the determination result is positive, and reproducing the image on the basis of the variable-magnified edge vectors which are not subjected to the adjusting processing in a case where the determination result is negative,
   wherein the adjusting processing is performed so that a width of a line, corresponding to the displaced vertex points, included in an image to be reproduced is reduced by one pixel regardless of the orientation of the line corresponding to the displaced vertex points.

10. The apparatus according to claim 9, wherein said reproduction means selects each of the vertex points of the edge vectors as a vertex point of interest, and displaces the vertex point of interest in a case where a connection pattern of the two edge vectors which share the vertex point of interest matches any one of predetermined connection patterns.

11. The apparatus according to claim 10, wherein said reproduction means further comprises:
   x-coordinate adjustment means for displacing, along an x-axis, the vertex point of interest in a direction to reduce an area of a figure surrounded by a loop which traces the vertex points of the edge vectors in a case where the connection pattern of the two edge vectors which share the vertex point of interest matches any one of the predetermined connection patterns; and
   y-coordinate adjustment means for displacing, along a y-axis, the vertex point of interest in a direction to reduce the area of the figure surrounded by the loop in a case where the connection pattern of the two edge vectors which share the vertex point of interest matches any one of the predetermined connection patterns.

12. The apparatus according to claim 11, wherein a displacement amount by each of said x- and y-coordinate adjustment means is one pixel.

13. The apparatus according to claim 12, further comprising output means for outputting an image generated by said reproduction means.

14. The apparatus according to claim 13, wherein said output means comprises a printer.

15. The apparatus according to claim 14, wherein said variable-magnification means performs the variable-magnification processing while smoothing the extracted edge vectors.

16. The apparatus according to claim 13, wherein said output means comprises a display device.

17. The apparatus according to claim 16, wherein said variable-magnification means performs the variable-magnification processing while smoothing the extracted edge vectors.

18. The apparatus according to claim 9, wherein said variable-magnification means skips the variable-magnification processing of the extracted edge vectors when the set magnification factor is 1.

19. The apparatus according to claim 9, wherein said variable-magnification means skips the variable-magnification processing of the extracted edge vectors when the set magnification factor is 1, and said reproduction means adjusts the edge vectors even if the set magnification factor is 1.

20. An image processing method, comprising:
   an extraction step of extracting edge vectors defined on a boundary between black and white pixel regions of an input image, wherein the edge vectors are constituted by a plurality of vertex points;
   a variable-magnification step of performing variable-magnification processing on the extracted edge vectors in accordance with a magnification factor;
   an adjustment step of adjusting the variable-magnified edge vectors; and
   a reproduction step of reproducing the image on the basis of the adjusted edge vectors,
   wherein said adjustment step includes a step of displacing vertex points selected from a plurality of vertex points constituting the variable-magnified edge vectors so that a width of a line, corresponding to the displaced vertex points, included in an image to be reproduced at said reproduction step is reduced by one pixel regardless of the orientation of the line corresponding to the displaced vertex points.

21. An image processing method, comprising:
- an extraction step of extracting edge vectors defined on a boundary between black and white pixel regions of an input image, wherein the edge vectors are constituted by a plurality of vertex points;
- a variable-magnification step of performing variable-magnification processing on the extracted edge vectors in accordance with a magnification factor;
- a determination step of determining whether or not the magnification factor is less than or equal to a predetermined value; and
- a reproduction step of adjusting the variable-magnified edge vectors by displacing vertex points selected from a plurality of vertex points constituting the variable-magnified edge vectors and reproducing the image on the basis of the adjusted edge vectors in a case where the determination result is positive, and reproducing the image on the basis of the variable-magnified edge vectors which are not subjected to the adjusting processing in a case where the determination result is negative,
- wherein the adjusting processing is performed so that a width of a line, corresponding to the displaced vertex points, included in an image to be reproduced is reduced by one pixel regardless of the orientation of the line corresponding to the displaced vertex points.

22. The method according to claim 21, wherein at the reproduction step, each of the vertex points of the edge vectors is selected as a vertex point of interest, and the vertex point of interest is displaced in a case where a connection pattern of the two edge vectors which share the vertex point of interest matches any one of predetermined connection patterns.

23. A computer readable memory which stores program codes associated with image processing, comprising:
- a code of an extraction step of extracting edge vectors defined on a boundary between black and white pixel regions of an input image, wherein the edge vectors are constituted by a plurality of vertex points;
- a code of a variable-magnification step of performing variable-magnification processing on the extracted edge vectors in accordance with a magnification factor;
- a code of an adjustment step of adjusting the variable-magnified edge vectors; and
- a code of a reproduction step of reproducing the image on the basis of the adjusted edge vectors,
- wherein said adjustment step includes a step of displacing vertex points selected from a plurality of vertex points constituting the variable-magnified edge vectors so that a width of a line, corresponding to the displaced vertex points, included in an image to be reproduced at said reproduction step is reduced by one pixel regardledss of the orientation of the line corresponding to the displaced vertex points.

24. A computer readable memory which stores program codes associated with image processing, comprising:
- a code of an extraction step of extracting edge vectors defined on a boundary between black and white pixel regions of an input image, wherein the edge vectors are constituted by a plurality of vertex points;
- a code of a variable-magnification step of performing variable-magnification processing on the extracted edge vectors in accordance with a magnification factor;
- a code of a determination step of determining whether or not the magnification factor is less than or equal to a predetermined value; and
- a code of a reproduction step of adjusting the variable-magnified edge vectors by displacing vertex points selected from a plurality of vertex points constituting the variable-magnified edge vectors and reproducing the image on the basis of the adjusted edge vectors in a case where the determination result is positive, and reproducing the image on the basis of the variable-magnified edge vectors which are not subjected to the adjusting processing in a case where the determination result is negative,
- wherein the adjusting processing is performed so that a width of a line, corresponding to the displaced vertex points, included in an image to be reproduced is reduced by one pixel regardless of the orientation of the line corresponding to the displaced vertex points.

25. A computer readable program associated with image processing, the program comprising:
- an extraction step of extracting edge vectors defined on a boundary between black and white pixel regions of an input image, wherein the edge vectors are constituted by a plurality of vertex points;
- a variable-magnification step of performing variable-magnification processing on the extracted edge vectors in accordance with a magnification factor;
- an adjustment step of adjusting the variable-magnified edge vectors; and
- a reproduction step of reproducing the image on the basis of the adjusted edge vectors,
- wherein said adjustment step includes a step of displacing vertex points selected from a plurality of vertex points constituting the variable-magnified edge vectors so that a width of a line, corresponding to the displaced vertex points, included in an image to be reproduced at said reproduction step is reduced by one pixel regardless of the orientation of the line corresponding to the displaced vertex points.

26. A computer readable program associated with image processing, the program comprising:
- an extraction step of extracting edge vectors defined on a boundary between black and white pixel regions of an input image, wherein the edge vectors are constituted by a plurality of vertex points;
- a variable-magnification step of performing variable-magnification processing on the extracted edge vectors in accordance with a magnification factor;
- a determination step of determining whether or not the magnification factor is less than or equal to a predetermined value; and
- a reproduction step of adjusting the variable-magnified edge vectors by displacing vertex points selected from a plurality of vertex points constituting the variable-magnified edge vectors and reproducing the image on the basis of the adjusted edge vectors in a case where the determination result is positive, and reproducing the image on the basis of the variable-magnified edge vectors which are not subjected to the adjusting processing in a case where the determination result is negative,
- wherein the adjusting processing is performed so that a width of a line, corresponding to the displaced vertex points, included in an image to be reproduced is reduced by one pixel regardless of the orientation of the line corresponding to the displaced vertex points.

\* \* \* \* \*

UNITED STATES PATENT AND TRADEMARK OFFICE
CERTIFICATE OF CORRECTION

PATENT NO. : 6,298,156 B1
DATED : October 2, 2001
INVENTOR(S) : Ishida et al.

It is certified that error appears in the above-identified patent and that said Letters Patent is hereby corrected as shown below:

Title page,
Item [56], References Cited, FOREIGN PATENT DOCUMENTS", insert the following:

--     4-157578     5/1992     (JP)
        5-020466     1/1993     (JP)
        5-020467     1/1993     (JP)
        5-020468     1/1993     (JP)
        4-040831     2/1993     (JP)
        5-108823     4/1993     (JP)
        5-174140     7/1993     (JP)
        6-012490     1/1994     (JP)
        6-337931     12/1994     (JP) --.

Drawings:
Sheet 1, Figure 1, "EDGE POINT" should read -- VERTEX POINT --;
Sheet 13, Figure 14, "EDGE POINT" should read -- VERTEX POINT --;
Sheet 15, Figure 16, "EDGE POINT" should read -- VERTEX POINT --;
Sheet 21, Figure 22, "EDGE POINT" should read -- VERTEX POINT --;
Sheet 24, Figure 25, "EDGE POINT" should read -- VERTEX POINT --;
Sheet 25, Figure 26, "EDGE POINT" should read -- VERTEX POINT --;
Sheet 26, Figure 27, "EDGE POINT" should read -- VERTEX POINT --;
Sheet 27, Figure 28, "EDGE POINT" should read -- VERTEX POINT --;
Sheet 29, Figure 30, "EDGE POINT" should read -- VERTEX POINT --;
Sheet 30, Figure 31, "EDGE POINT" should read -- VERTEX POINT --;
Sheet 31, Figure 32, "EDGE POINT" should read -- VERTEX POINT --; and
Sheet 32, Figure 33, "EDGE POINT" should read -- VERTEX POINT --.

Column 3,
Line 30, "an" should read -- a --.

Column 4,
Line 3, "vertex vector" should read -- edge vector --;
Line 4, "edge points" should read -- vertex points --;
Line 8, "vertex vectors" should read -- edge vectors -- and "edge point" should read -- vertex point --;
Line 19, "vertex vectors," should read -- edge vectors, --; and
Line 20, "edge point" should read -- vertex point --.

UNITED STATES PATENT AND TRADEMARK OFFICE
CERTIFICATE OF CORRECTION

PATENT NO. : 6,298,156 B1
DATED : October 2, 2001
INVENTOR(S) : Ishida et al.

It is certified that error appears in the above-identified patent and that said Letters Patent is hereby corrected as shown below:

Column 5,
Line 4, "vertex vector" should read -- edge vector --;
Line 5, "edge point" should read -- vertex point --;
Line 6, "vertex vectors" should read -- edge vectors -- and "edge point" should read -- vertex point --;
Line 16, "vertex vector" should read -- edge vector -- and "an edge" should read -- a vertex --;
Line 62, "edge point" should read -- vertex point --; and
Line 66, "edge point" should read -- vertex point --.

Column 6,
Line 30, "edge" (both occurrences) should read -- vertex --; and
Line 34, "an" should read -- a --.

Column 8,
Line 7, "edge" (second occurrence) should read -- vertex --; and
Line 63, "an" should read -- a --.

Column 10,
Line 56, "an edge point" should read -- a vertex point --.

Column 11,
Line 34, "edge" should read -- vertex --.

Column 13,
Line "s103" should read -- S103 --.

Column 17,
Line 19, "edge" should read -- vertex --; and
Line 20, "edge" should read -- vertex --.

Column 18,
Line 50, "edge" should read -- vertex --;
Line 52, "edge" should read -- vertex --;
Line 55, "edge" should read -- vertex --;
Line 59, "edge" should read -- vertex --;
Line 60, "an" should read -- a --;
Line 61, "edge" should read -- vertex --;
Line 64, "edge" should read -- vertex --; and
Line 65, "edge" should read -- vertex --.

UNITED STATES PATENT AND TRADEMARK OFFICE
CERTIFICATE OF CORRECTION

PATENT NO. : 6,298,156 B1
DATED : October 2, 2001
INVENTOR(S) : Ishida et al.

It is certified that error appears in the above-identified patent and that said Letters Patent is hereby corrected as shown below:

<u>Column 24,</u>
Line 65, "pixel" should read -- pixel, --.

<u>Column 25,</u>
Line 62, "pixel" should read -- pixel, --.

<u>Column 26,</u>
Line 65, "pixel" should read -- pixel, --.

<u>Column 27,</u>
Line 25, "pixel" should read -- pixel, --; and
Line 52, "pixel" should read -- pixel, --.

<u>Column 28,</u>
Line 14, "pixel" should read -- pixel, --;
Line 35, "pixel" should read -- pixel, --; and
Line 64, "pixel" should read -- pixel, --.

Signed and Sealed this

Tenth Day of September, 2002

Attest:

Attesting Officer

JAMES E. ROGAN
*Director of the United States Patent and Trademark Office*